United States Patent [19]

Suzuki

[11] Patent Number: 5,749,068
[45] Date of Patent: May 5, 1998

[54] SPEECH RECOGNITION APPARATUS AND METHOD IN NOISY CIRCUMSTANCES

[75] Inventor: Tadashi Suzuki, Tokyo, Japan

[73] Assignee: Mitsubishi Denki Kabushiki Kaisha, Tokyo, Japan

[21] Appl. No.: 732,891

[22] Filed: Oct. 17, 1996

[30] Foreign Application Priority Data

Mar. 25, 1996 [JP] Japan ................................. 8-068210

[51] Int. Cl.$^6$ .............................. G10L 3/02; G10L 9/00
[52] U.S. Cl. ................................ 704/233; 704/226
[58] Field of Search .......................... 704/233, 240, 704/227, 228, 226; 381/94

[56] References Cited

U.S. PATENT DOCUMENTS

| | | | |
|---|---|---|---|
| 4,283,601 | 8/1981 | Nakajima et al. | 704/227 |
| 4,532,649 | 7/1985 | Noso et al. | 704/270 |
| 4,852,181 | 7/1989 | Morito et al. | 704/233 |
| 4,897,878 | 1/1990 | Boll et al. | 704/233 |
| 4,918,735 | 4/1990 | Morito et al. | 704/233 |
| 5,212,764 | 5/1993 | Ariyoshi | 704/200 |
| 5,390,280 | 2/1995 | Kato et al. | 704/233 |
| 5,400,409 | 3/1995 | Linhard | 381/92 |
| 5,577,161 | 11/1996 | Pelaez | 704/226 |
| 5,655,057 | 8/1997 | Takagi | 704/233 |

OTHER PUBLICATIONS

Nalazco, et al., "Continuous Speech Rrecognition in Noise using Spectral Substraction and HMM Adaptation" ICASSP '94, pp. 1-409-1-412.

Lee, et al., "Nonlinear Ceptral Equalization Method for Noisy Speech Recognition" IEE Proceedings-vision, image and signal processing, Dec. 1994, pp. 397-402.

Kobatake, et al., "Degraded Word Recognition Based on Segmental Signal to Noise Ratio Weighting" ICASSP, '94, pp. 1-425-1-428.

Primary Examiner—Allen R. MacDonald
Assistant Examiner—Patrick N. Edouard
Attorney, Agent, or Firm—Burns, Doane, Swecker & Mathis, LLP

[57] ABSTRACT

An estimated-SN(Signal Noise)-ratio is calculated for a time-series feature vector of noise-superimposed speech by using a noise-free speech model and a noise model. A noise-superimposed model is generated based on the estimated-SN-ratio. A likelihood between the time-series feature vector of noise-superimposed speech and the noise-superimposed model is calculated to obtain likelihood information. A noise spectrum included in the noise-superimposed speech is estimated from the likelihood information.

13 Claims, 21 Drawing Sheets

Fig.5

| No. | SORT | NORMALIZED CORRELATION CO. VECTOR |
|---|---|---|
| 1 | VOWEL a | S1 |
| 2 | VOWEL i | S2 |
| 3 | VOWEL u | S3 |
| 4 | VOWEL e | S4 |
| 5 | VOWEL o | S5 |
| 6 | VOWEL s | S6 |
| ⋮ | ⋮ | ⋮ |
| m | CONSONANT f | Sm |
| ⋮ | ⋮ | ⋮ |
| M | CONSONANT z | SM |

| No. | SORT | NORMLZD CORRELATION CO. VECTR | NORMLZD PW. SPECTRUM |
|---|---|---|---|
| 1 | WHITE NOISE | V1 | W1 |
| 2 | PINK NOISE | V2 | W2 |
| 3 | PLANT NOISE | V3 | W3 |
| ⋮ | ⋮ | ⋮ | ⋮ |
| n | TRAIN NOISE | Vn | Wn |
| ⋮ | ⋮ | ⋮ | ⋮ |
| N | OFFICE NOISE | VN | WN |

Fig.7

| FRAME No. | ANALYSIS FRAME | NORMALIZED A-CORRELATION CO. VECTOR |
|---|---|---|
| 1 | F1 | X1 |
| 2 | F2 | X2 |
| 3 | F3 | X3 |
| ⋮ | ⋮ | ⋮ |
| i | Fi | Xi |
| ⋮ | ⋮ | ⋮ |
| I | FI | XI |

Fig.19

| SPEECH DATA | SPEAKER : TWO MALES<br>VOCABULARY : 1 SET OF 492 WORDS OF PHONEME BALANCE (FOR STUDY)<br>1 SET OF 100 CITY NAMES (FOR RECOGNITION / EVALUATION) |
|---|---|
| SUPERIMPOSED NOISE | PINK NOISE, PLANT NOISE |
| ACOUSTIC ANALYSIS | A/D : 16bits 10kHz<br>HIGH - FREQUENCY EMPHASIS : $1 - 0.95 \cdot z^{-1}$<br>ANALYSIS WINDOW/PERIOD : Hamming 25.6msec/10.0msec<br>LPC ANALYSIS : 12 DIMENSION<br>FFT : 256 |
| FEATURE VECTOR | LPC CEPSTRUM 1-16 DIMENSION<br>+ DELTA CEPSTRUM 1-16 DIMENSION |
| PHONEME HMM | CONTINOUS DISTRIBUTION, LIMITED DURATION TIME |

SPEECH RECOGNITION APPARATUS AND METHOD IN NOISY CIRCUMSTANCES

BACKGROUND OF THE INVENTION

1. Field of the Invention

The present invention relates to a speech recognition apparatus and a speech recognizing method for speech which is uttered in noisy circumstances and wherein noise is superimposed.

2. Description of the Related Art

Collation process based on spectrum information of speech is performed in recognizing speech. Speech model for the collation process is usually studied in good circumstances. Namely, speech data for the collation process is uttered in good circumstances. However, there is a case that it is necessary to recognize speech uttered in noisy circumstances. In this case, recognition performance is largely deteriorated by a noise signal superimposed in a speech signal.

In order to solve this problem, there is a system of eliminating noise components at power spectrum. In this system, firstly noise state is studied in a non-speech section in an input signal. Then, supposing that the same noise as in the non-speech section is superimposed in a speech section, the noise components in the speech section are eliminated at the power spectrum.

FIG. 23 shows a configuration example of a speech recognition apparatus in noisy circumstances, wherein spectrum subtraction method is used. This apparatus is disclosed in the article "Acoustic Engineering Seminar 7—Revised Speech—Japan Acoustics Society" (by Kazuo Nakata, Korona Company pp. 130–131).

In FIG. 23, a spectrum calculator 3 analyzes spectrum of a noise-superimposed speech signal 200 input at an input terminal 1. Then, the spectrum calculator 3 outputs a time-series noise-superimposed speech spectrum 201. A noise spectrum eliminator 4 eliminates noise components in the time-series noise-superimposed speech spectrum 201, by using an estimated superimposed-noise spectrum 5 which has been prepared in advance. Then, the noise spectrum eliminator 4 outputs a time-series noise-eliminated speech spectrum 202. A feature vector calculator 6 calculates a time-series feature vector 203 of noise-eliminated speech from the time-series noise-eliminated speech spectrum 202. A collating unit 7 collates the time-series feature vector 203 of noise-eliminated speech with speech models 204 for collation stored in a reference model memory 8. Then, one of the speech models 204, which has the highest likelihood, is selected based on the collation. The collating unit 7 outputs category of the selected speech model 204 as a recognition result 9.

FIG. 24 shows a configuration example of the speech recognition apparatus in noisy circumstances of FIG. 23, wherein an average spectrum calculator 10 is used for generating the estimated superimposed-noise spectrum 5. The average spectrum calculator 10 calculates the estimated superimposed-noise spectrum 5, by using the time-series noise-superimposed speech spectrum 201 from the spectrum calculator 3. Then, the average spectrum calculator 10 outputs the calculated estimated superimposed-noise spectrum 5 to the noise spectrum eliminator 4.

FIG. 25 shows relation between the noise-superimposed speech signal 200 input from the input terminal 1 and analysis frames. FIG. 26 shows speech sections T2, T4 and noise sections T1 and T3.

Operation will now be described. The speech models 204 for collation are made based on speech data whose speech was uttered in quiet circumstances and thus superimposes no noise. The speech models 204 for collation are, in advance, stored in the reference model memory 8.

Power spectrum of the noise-superimposed speech signal 200 input from the input terminal 1 is calculated at each analysis frame F1, F2, ..., Fi, ..., FI in the spectrum calculator 3. Then, the calculated power spectrum is output as the time-series noise-superimposed speech spectrum 201. In the noise spectrum eliminator 4, noise eliminating process is performed for each noise-superimposed speech spectrum of the time-series noise-superimposed speech spectrum 201. In this case, it is supposed that the estimated superimposed-noise spectrum 5 is superimposed in the each noise-superimposed speech spectrum, as the power spectrum of the noise. The following equation (1) shows the noise eliminating process.

[equation (1)]

$$S(\omega) = max\{X(\omega) - \alpha \cdot N(\omega), 0\}$$

$S(\omega)$ denotes power at frequency $\omega$ of noise-eliminated speech spectrum. $X(\omega)$ denotes power at frequency $\omega$ of noise-superimposed speech spectrum. $N(\omega)$ denotes power at frequency $\omega$ of estimated superimposed-noise spectrum. $\alpha$ is a parameter, being a positive value, which designates degree of eliminating noise components. The parameter $\alpha$ is adjusted to be amount for making recognition accuracy be the maximum. max {. . .} in the equation (1) is a function for outputting a maximum value in the elements between the parentheses.

The feature vector calculator 6 performs a feature vector calculating process for each noise-eliminated speech spectrum of the time-series noise-eliminated speech spectrum 202 output from the noise spectrum eliminator 4. Namely, the feature vector calculator 6 converts the each noise-eliminated speech spectrum to a vector designating acoustic feature used in speech recognition, such as auto-correlation coefficient and LPC (Linear Predictive Coding) cepstrum. The above procedure is performed for all of the time-series noise-eliminated speech spectrum 202. Then, the feature vector calculator 6 outputs the time-series feature vector 203 of noise-eliminated speech.

The collating unit 7 collates the time-series feature vector 203 of noise-eliminated speech with the speech models 204 for collation stored in the reference model memory 8. Then, one of the speech models 204, with which the highest likelihood can be obtained, is selected based on the collation. The collating unit 7 outputs category of the selected speech model 204 as a recognition result 9.

The average spectrum calculator 10 inputs the time-series noise-superimposed speech spectrum 201 output from the spectrum calculator 3. The average spectrum calculator 10 averages one or more than one noise-superimposed speech spectrum of a non-speech section in the time-series noise-superimposed speech spectrum 201, for each of predetermined frequency bandwidths. The non-speech section in the time-series noise-superimposed speech spectrum 201 is, for example, the noise section T1, being just before the speech section, or T3, generated in an idle section during speech utterance, as shown in FIG. 26. An averaged noise-superimposed speech spectrum is output as the estimated superimposed-noise spectrum 5.

Accordingly, supposing that average power spectrum of the noise section T1 or T3 is superimposed in each noise-superimposed speech spectrum in the speech section T2 or T4 of the time-series noise-superimposed speech spectrum 201 generated by the spectrum analysis of input noise-superimposed speech signal 200, noise components are eliminated at the power spectrum. Then, a collation process with noise-free collation model is performed for the noise-components-eliminated power spectrum, and a recognition result is obtained based on the collation process.

Since the conventional speech recognition apparatus in noisy circumstances is composed as the above, it operates comparatively well when difference between the average power spectra in the noise sections T1 and T3 and the power spectra of noise superimposed in the speech of actual speech sections T2 and T4 is small. In other words, the apparatus operates comparatively well when dynamic range of change of the noise in the circumstances is small. However, when the speech input terminal (microphone) of the speech recognition apparatus is moved under its operation or when the noise source moves, for instance, distance between an input terminal of speech signal and a noise source occasionally changes. In this case or in the case of background noise unsteadily and largely changing, error between the average power spectrum obtained in the section just before speech utterance and the power spectrum of noise actually superimposed in the speech becomes large. Therefore, the recognition performance becomes deteriorated, which has been a problem of the conventional speech recognition apparatus.

An object of the present invention is to solve this problem, and thus the invention aims for dealing with the deterioration of the recognition performance caused by a change of the background noise or a distance change between the noise source and the microphone for inputting speech. The deterioration of the recognition performance can be overcome by way of obtaining an estimated superimposed-noise spectrum per noise-superimposed speech spectrum of the time-series noise-superimposed speech spectrum by using a noise model representing a noise signal and a noise-free speech model representing a speech without noise.

Another object of the present invention is to provide a speech recognition apparatus wherein likelihood calculation between the time-series feature vector of noise-superimposed speech and a noise-free speech model is performed. In this case, it is taken into account that noise represented by the noise model is superimposed in the noise-free speech model. Then, power spectrum of superimposed-noise is estimated based on highest likelihood, per analysis frame of noise-superimposed input speech. Therefore, an estimated superimposed-noise spectrum, which does not easily get the effect of the superimposed noise change caused by the distance change between the input speech microphone and the noise source or unsteady noise background, can be obtained. Accordingly, the deterioration of the recognition performance can be suppressed.

Another object of the present invention is to provide a speech recognition apparatus wherein one or more than one noise spectrum and a feature vector corresponding to each spectrum are stored in a noise model memory as a noise model. Therefore, a superimposed noise generated in the unsteady noise background can be accurately modelled and the accuracy of an estimated superimposed-noise spectrum is enhanced, thus the deterioration of the recognition accuracy can be suppressed.

Another object of the present invention is to provide a speech recognition apparatus wherein one or more than one noise-free speech feature vector is stored in a speech model memory as a noise-free speech model. Therefore, a noise-free speech can be accurately modelled, thus the accuracy of the estimated superimposed-noise spectrum is enhanced. The estimated superimposed-noise spectrum can be estimated per analysis frame of the noise-superimposed input speech. Thus the processes up to the feature vector calculator can be rapidly sped up by means of pipeline process, for instance.

Another object of the present invention is to provide a speech recognition apparatus wherein a model, in which all the syllable models are mutually connected, is stored in the speech model memory as the noise-free speech model. The accuracy of the noise-free speech model representing speech without noise is enhanced. Therefore, the accuracy of estimating superimposed noise can be improved. Namely, the speech recognition apparatus in noisy circumstances having higher accuracy can be realized.

Another object of the present invention is to provide a speech recognition apparatus wherein a likelihood calculator calculates the likelihood per combination of the noise model and the speech model. Then, weight data is calculated by selecting the highest likelihood out of collation data. Therefore, the estimated superimposed-noise spectrum can be obtained by executing a small amount of calculation.

Another object of the present invention is to provide a speech recognition apparatus wherein the likelihood calculator calculates the likelihood per combination of the noise model and the speech model. Then, weight data is calculated by selecting a plurality of likelihoods, in order of highness of the likelihood, out of the collation data. Therefore, deterioration of accuracy of the estimated superimposed-noise spectrum caused by error between the noise model and noise actually superimposed or error between the noise-free speech model and an actual speech can be suppressed.

Another object of the present invention is to provide a speech recognition apparatus wherein the likelihood calculator calculates the likelihood per combination of the noise model and the speech model. Then, a plurality of likelihoods, in order of highness of the likelihood, are selected out of the collation data and weighted addition of likelihood obtained from corresponding noise model is performed. Weight data is calculated by obtaining a noise model whose result of the weighted addition is maximum. Therefore, deterioration of accuracy of the estimated superimposed-noise spectrum caused by error between the noise model and noise actually superimposed or error between the noise-free speech model and an actual speech can be suppressed.

SUMMARY OF THE INVENTION

According to one aspect of the present invention, a speech recognition apparatus for recognizing an input speech under noisy circumstances includes:

a noise model memory for storing a noise model;

a speech model memory for storing a noise-free speech model;

a reference model memory for storing a plurality of speech models for collation;

an acoustic analyzer for receiving the input speech, acoustically analyzing a noise-superimposed speech signal of the input speech, and outputting a time-series feature vector of noise-superimposed speech;

a superimposed-noise estimating unit for estimating a superimposed noise based on the time-series feature vector of noise-superimposed speech by using the noise model stored in the noise model memory and the noise-free speech model stored in the speech model memory, and outputting an estimated superimposed-noise spectrum;

a spectrum calculator for receiving the input speech, analyzing a spectrum of the noise-superimposed speech signal of the input speech, and outputting a time-series noise-superimposed speech spectrum;

a noise spectrum eliminator for eliminating a spectrum component of a noise speech in the noise-superimposed speech signal for the time-series noise-superimposed speech spectrum output from the spectrum calculator by using the estimated superimposed-noise spectrum output from the superimposed-noise estimating unit, and outputting a time-series noise-eliminated speech spectrum;

a feature vector calculator for calculating a first feature vector from the time-series noise-eliminated speech spectrum and outputting a time-series feature vector of noise-eliminated speech; and a collating unit for collating the time-series feature vector of noise-eliminated speech with the plurality of speech models for collation stored in the reference model memory, selecting a speech model out of the plurality of speech models for collation, whose likelihood is highest, and outputting the speech model as a recognition result.

According to another aspect of the present invention, the noise recognition apparatus wherein the superimposed-noise estimating unit includes:

an estimated-SN(Signal Noise)-ratio calculator for inputting the time-series feature vector of noise-superimposed speech output from the acoustic analyzer, calculating an estimated-SN-ratio for each noise-superimposed speech feature vector by using the noise model stored in the noise model memory and the noise-free speech model stored in the speech model memory, and outputting the estimated-SN-ratio;

a noise-superimposed speech model generator for synthesizing the noise model stored in the noise model memory with the noise-free speech model stored in the speech model memory based on the estimated-SN-ratio, generating a noise-superimposed speech model and outputting the noise-superimposed speech model;

a likelihood calculator for collating the noise-superimposed speech model with the noise-superimposed speech feature vector, which was used for calculating the estimated-SN-ratio in the estimated-SN-ratio calculator, calculating a likelihood between the noise-superimposed speech model and the noise-superimposed speech feature vector, and outputting the likelihood as first collation data;

a weight data calculator for calculating first weight data for a combination of the each noise-superimposed speech feature vector, the noise model and the noise-free speech model by using the first collation data, and outputting the first weight data; and a noise spectrum generator for generating an estimated superimposed-noise spectrum by using the first weight data, the estimated-SN-ratio output from the estimated-SN-ratio calculator, the time-series feature vector of noise-superimposed speech output from the acoustic analyzer, and the noise model stored in the noise model memory, and for outputting the estimated superimposed-noise spectrum.

According to one aspect of the present invention, a speech recognition method for recognizing an input speech under noisy circumstances, having a noise model memory for storing a noise model, a speech model memory for storing a noise-free speech model, and a reference model memory for storing a plurality of speech models for collation, the method includes the steps of:

analyzing a noise-superimposed speech signal of the input speech acoustically to output a time-series feature vector of noise-superimposed speech;

estimating a superimposed-noise for the time-series feature vector of noise-superimposed speech by using the noise model stored in the noise model memory and the noise-free speech model stored in the speech model memory to output an estimated superimposed-noise spectrum;

calculating a spectrum of the noise-superimposed speech signal in the input speech by performing a spectrum-analysis to output a time-series noise-superimposed speech spectrum;

eliminating a spectrum component of a noise speech in the noise-superimposed speech signal for the time-series noise-superimposed speech spectrum output from the step of calculating the spectrum by using the estimated superimposed-noise spectrum output from the step of estimating the superimposed-noise to output a time-series noise-eliminated speech spectrum;

calculating a first feature vector from the time-series noise-eliminated speech spectrum to output a time-series feature vector of noise-eliminated speech; and collating the time-series feature vector of noise-eliminated speech with the plurality of speech models for collation stored in the reference model memory to select and output a speech model out of the plurality of speech models for collation, whose likelihood is highest, as a recognition result.

Other objects, features, and advantages of the invention will be apparent from the following description when taken in conjunction with the accompanying drawings.

BRIEF DESCRIPTION OF THE DRAWINGS

FIG. 5 shows a speech model memory according to Embodiment 1 of the present invention;

FIG. 6 shows a noise model memory according to Embodiment 1 of the present invention;

FIG. 7 shows a normalized auto-correlation coefficient vector of each analysis frame according to Embodiment 1 of the present invention;

FIG. 19 is a chart showing experiment conditions of the present invention;

DESCRIPTION OF THE PREFERRED EMBODIMENTS

Embodiment 1.

Figure 1:
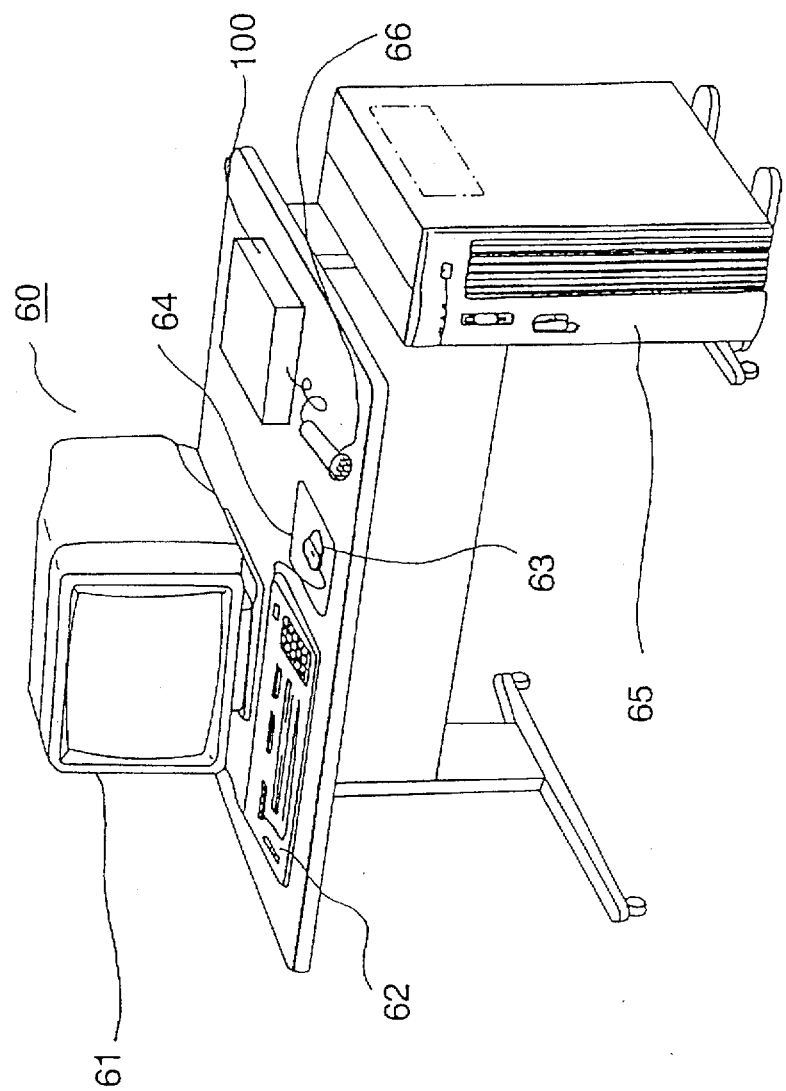
FIG. 1 shows a configuration of a speech recognition system according to Embodiment 1 of the present invention.

FIG. 1 shows a configuration of a speech recognition system according to an embodiment of the present invention. A display unit 61, a keyboard 62, a mouse 63, a mouse pad 64, a system unit 65, a microphone 66 for inputting speech and a speech recognition apparatus 100 are provided in a speech recognition system 60. According to the speech recognition system of this embodiment as shown in FIG. 1, an input speech input from the microphone 66 is recognized at the speech recognition apparatus 100, and a recognized speech is transferred to the system unit 65, and the recognized speech is displayed in letters on the screen of the display unit 61. However, it is not necessary for the speech recognition system of the present embodiment to be always used with, such as a personal computer and a work station as stated in reference to FIG. 1. It is acceptable for the speech recognition system of the present embodiment to apply any system type as long as the speech recognition apparatus 100 having characteristics stated as follows is used in the system. For instance, it is acceptable to use a tape recorder as an input apparatus or to input speech data from a network, instead of using the microphone 66. Regarding input data, either of analogue data and digital data is acceptable. Relating to the speech recognition apparatus 100, it can be an independent box, can be stored in the system unit 65, or can be a part of system board of a measuring device or a computating device. On the recognition result, it is acceptable not only to display the result in letters but also to perform data retrieval, processing operation or measurement operation based on the recognition result.

Figure 2:
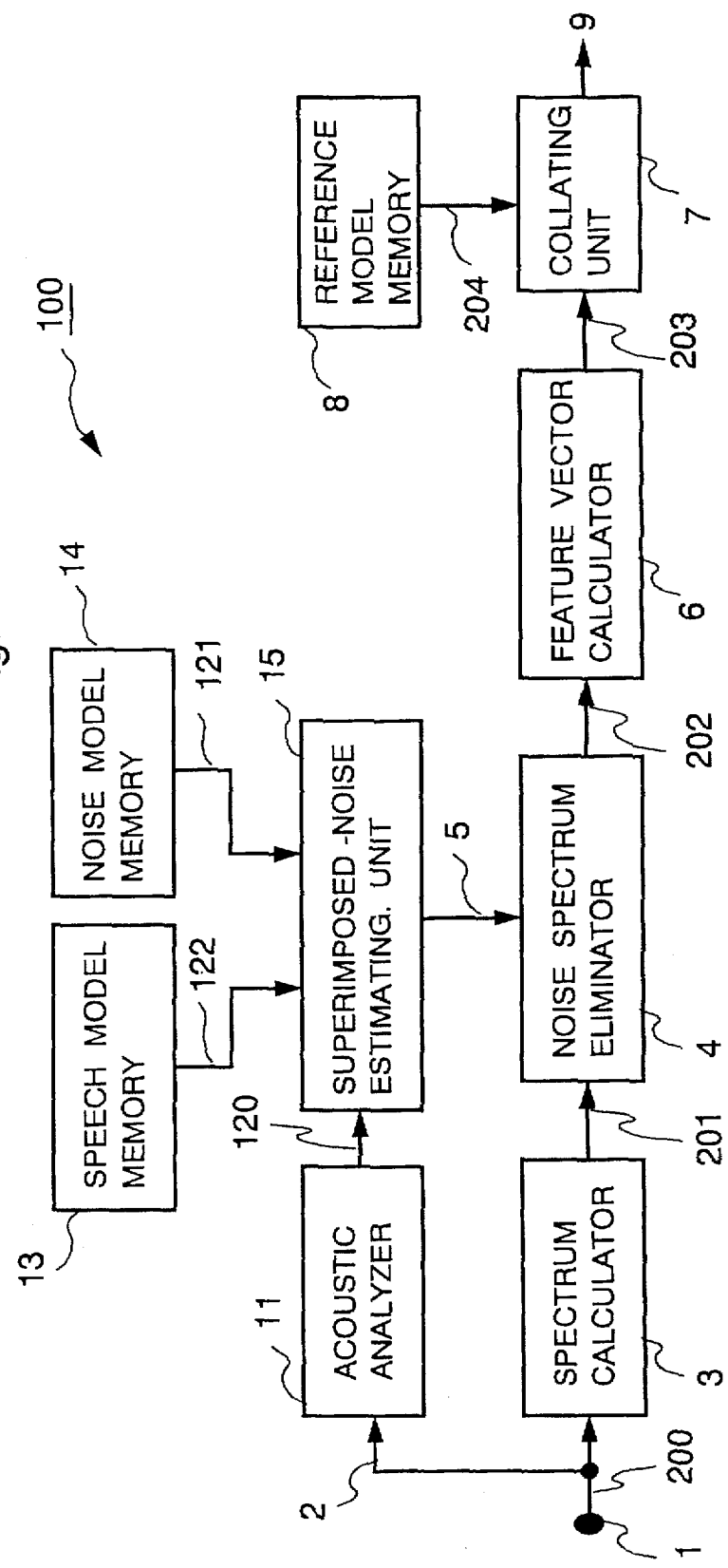
FIG. 2 is a block diagram showing a configuration of a speech recognition apparatus in noisy circumstances according to Embodiment 1 of the present invention.

FIG. 2 is a block diagram showing a configuration of the speech recognition apparatus 100 in noisy circumstances according to an embodiment of the present invention. In FIG. 2, an acoustic analyzer 11 performs acoustic analysis for a noise-superimposed speech signal 200 input from an input terminal 1 and outputs a time-series feature vector 120 of noise-superimposed speech. A speech model memory 13 stores a noise-free speech model representing speech without noise. A noise model memory 14 stores a noise model representing noise. A superimposed-noise estimating unit 15 estimates superimposed noise of the time-series feature vector 120 of noise-superimposed speech output from the acoustic analyzer 11, by using a noise model 121 stored in the noise model memory and a noise-free speech model 122 stored in the speech model memory. Then, the superimposed-noise estimating unit 15 outputs an estimated superimposed-noise spectrum 5. Other elements in the configuration of this embodiment are similar to those of the conventional one.

Figure 3:
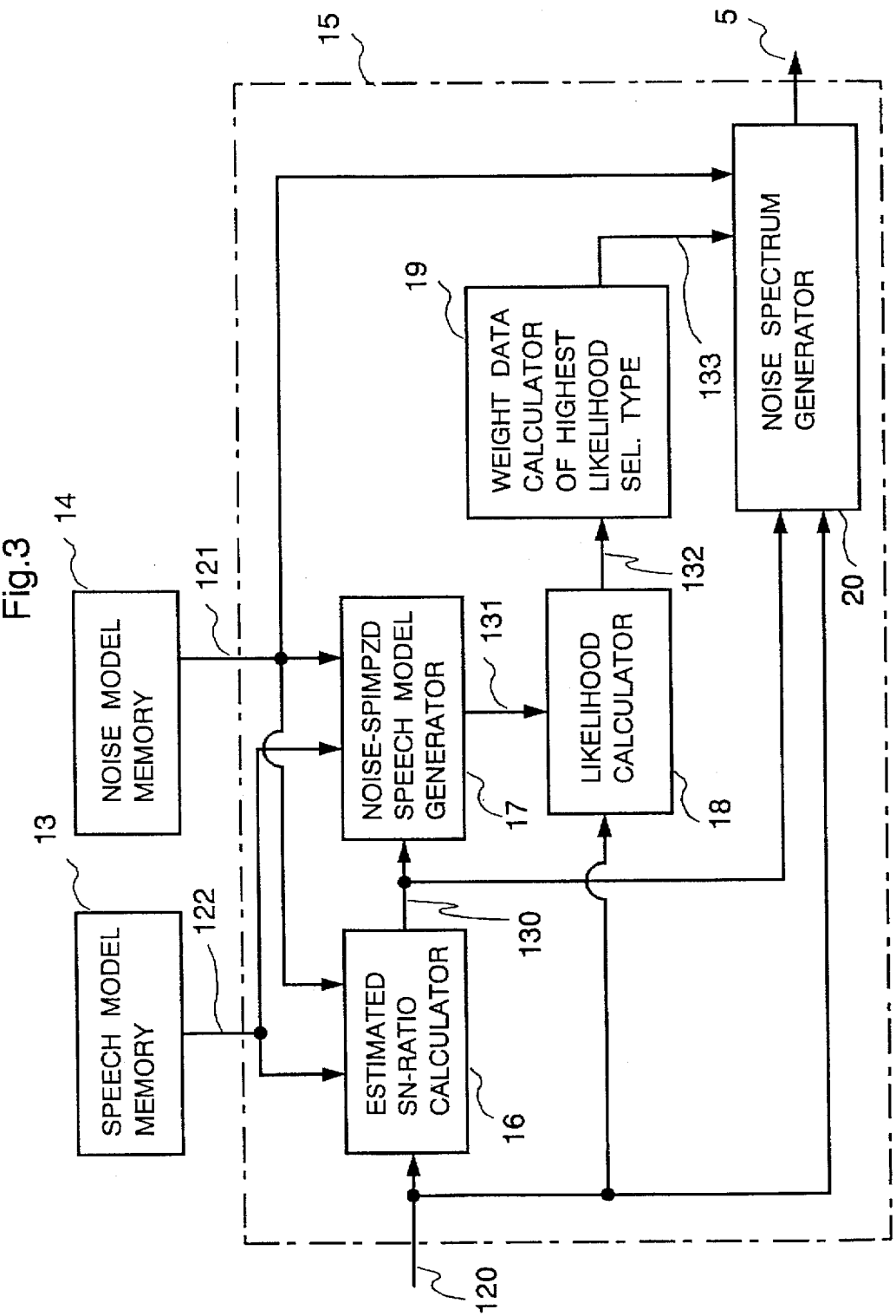
FIG. 3 is a block diagram showing a configuration of an superimposed-noise estimating unit according to Embodiment 1 of the present invention.

FIG. 3 is a block diagram showing a configuration of an embodiment of the superimposed-noise estimating unit 15 according to the speech recognition apparatus 100 in noisy circumstances of the present embodiment. In FIG. 3, an estimated-SN(Signal Noise)-ratio calculator 16 calculates an estimated-SN-ratio 130 for each noise-superimposed speech feature vector of the time-series feature vector 120 of noise-superimposed speech output from the acoustic analyzer 11. In this case, the estimated-SN-ratio calculator 16 uses the noise-free speech model 122 stored in the speech model memory 13 and the noise model 121 stored in the noise model memory 14, for calculating the estimated-SN-ratio 130. A noise-superimposed-speech-model generator 17 synthesizes the noise-free speech model 122 and the noise model 121 based on estimated-SN-ratio data output from the estimated-SN-ratio calculator 16. Then, the noise-superimposed-speech-model generator 17 generates a noise-superimposed speech model 131. A likelihood calculator 18 collates the noise-superimposed speech model 131 with the time-series feature vector 120 of noise-superimposed speech. Then, the likelihood calculator 18 calculates correspondence data and likelihood between each noise-superimposed speech feature vector and the noise-superimposed speech model 131, and outputs the correspondence data and the likelihood as collation data 132. A weight data calculator 19 of highest likelihood selection type inputs the collation data 132 and calculates a weight data 133. A noise spectrum generator 20 generates the estimated superimposed-noise spectrum 5 by using the time-series feature vector 120 of noise-superimposed speech, estimated-SN-ratio data output from the estimated-SN-ratio calculator 16, the weight data 133 output from the weight data calculator 19 of highest likelihood selection type, and the noise model 121 stored in the noise model memory 14.

Figure 4:
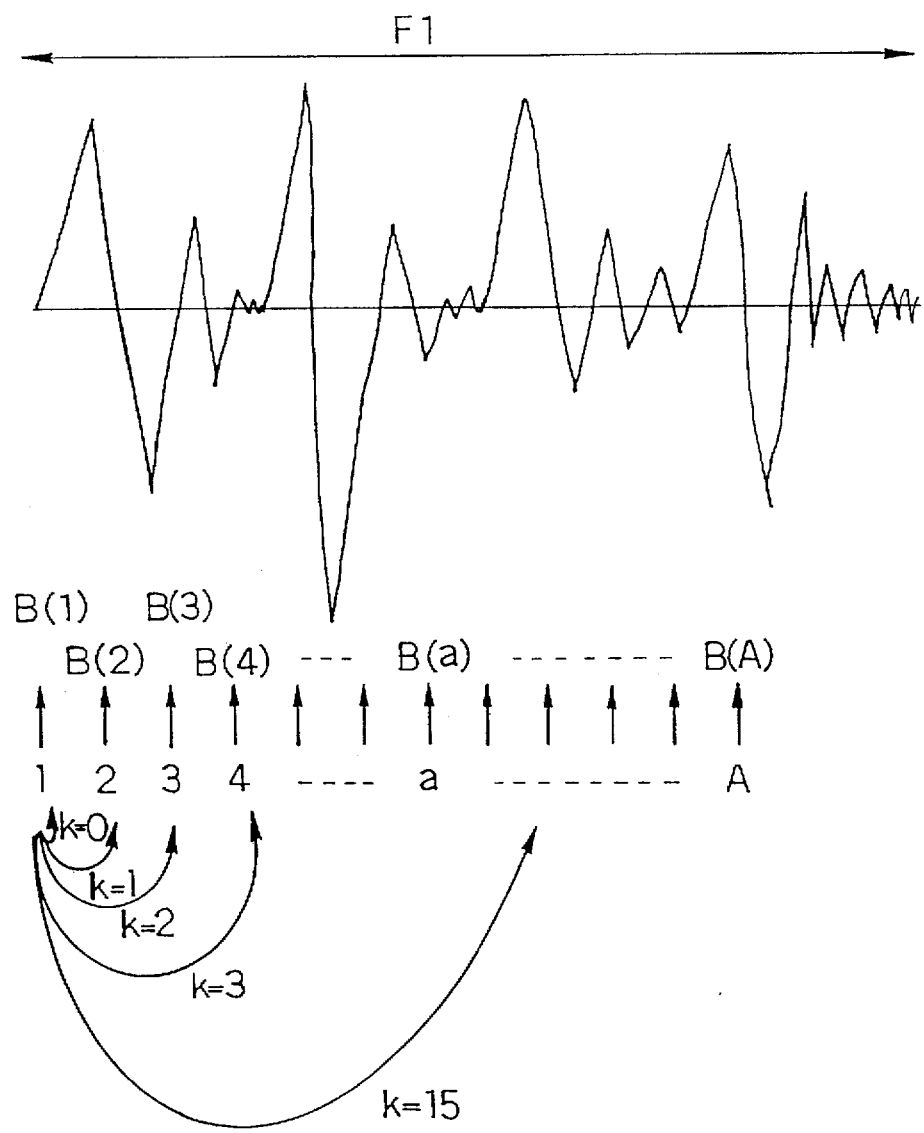
FIG. 4 illustrates auto-correlation coefficient according to Embodiment 1 of the present invention.

Operation will now be stated. Auto-correlation coefficient and normalized auto-correlation coefficient are explained with reference to FIG. 4 showing an analysis frame F1. Samplings are performed A times in the analysis frame F1. A value of feature vector at each sampling is defined to be $B(1), B(2), \ldots, B(a), \ldots, B(A)$. The auto-correlation coefficient can be obtained by integrating a value $B(a)$, being own feature vector, and a value of feature vector $B(a+k)$, being away from own by k, and by summing the integrated values. Namely, auto-correlation coefficient $z(k)$ can be calculated by the following equation (2).

[equation (2)]

$$z(k) = \sum_{a=1}^{A-k} B(a) \cdot B(a+k)$$

k denotes order, namely k=0 indicates zero-th order. z(0) indicates auto-correlation coefficient of zero-th order. As shown in equation (3), an auto-correlation coefficient of zero-th order is defined to be sum of values of feature vector $B(a)^2$.

[equation (3)]

$$z(0) = \sum_{a=1}^{A-0} B(a) \times B(a+0) = \sum_{a=1}^{A} B(a)^2$$

The auto-correlation coefficient of zero-th order is a value designating power. Normalized auto-correlation coefficient zn(k) can be calculated by normalizing auto-correlation coefficient z(k) by power as shown in equation (4).

[equation (4)]

$$zn(k) = \frac{z(k)}{z(0)}$$

The following equation (5) shows normalized auto-correlation coefficient vector Z which is obtained by expressing the normalized auto-correlation coefficient using vector with respect to 0-th order to 15-th order as just an example.

[equation (5)]

$$Z = \{zn(0), zn(1), \ldots, zn(15)\}$$

The auto-correlation coefficient can be also obtained by performing inverse Fourier transform for power spectrum in the analysis frame F1. The case of the normalized auto-correlation coefficient vector being calculated by using the analysis frame F1 was explained using FIG. 4. The normalized auto-correlation coefficient vector can be obtained by the same procedure for a noise-free speech or noise.

Concrete operation of this embodiment will now be described. As shown in FIG. 5, typical power spectra of noise-free speeches, such as power spectra of vowels [a], [i], [u], [e], [o] and various consonants are calculated, and normalized auto-correlation coefficient vectors corresponding to the typical power spectra are in advance stored in the speech model memory 13 as the noise-free speech models 122. In this case, the number of the typical power spectra is defined to be M. Namely, one or more than one noise-free speech feature vector is stored in the speech model memory as the noise-free speech model. m-th normalized auto-correlation coefficient vector is defined to be Sm ($1 \leq m \leq M$). It is assumed that the normalized auto-correlation coefficient vector, being a representative point of each noise-free speech, is observed at equivalent probability.

Regarding the noise, as shown in FIG. 6, typical power spectra of the noise are calculated, and normalized auto-correlation coefficient vectors and normalized power spectra corresponding to the typical power spectra of the noise are stored in the noise model memory 14 as noise models 121. In this case, the number of the typical power spectra is defined to be N. Namely, one or more than one noise spectrum and a feature corresponding to each spectrum are stored in the noise model memory as the noise model. The normalized power spectrum can be obtained by performing Fourier transform for the normalized auto-correlation coefficient. When there is enough time for processing, it is not necessary to calculate the normalized power spectrum in advance. It is acceptable to perform Fourier transform, at each necessary occasion, for the normalized auto-correlation coefficient vector so as to obtain the normalized power spectrum.

n-th normalized auto-correlation coefficient vector is defined to be Vn ($1 \leq n \leq N$) and n-th normalized power spectrum is defined to be Wn ($1 \leq n \leq N$). It is assumed that the normalized auto-correlation coefficient vector, being a representative point of each noise, is observed at equivalent probability.

The acoustic analyzer 11 performs acoustic analysis for each of analysis frames F1, F2, ..., Fi, ..., FI in the noise-superimposed speech signal 200 input from the input terminal 1. The analysis frames F1, F2, ..., Fi, ..., FI are objects of spectrum analysis processing at the spectrum calculator 3. Then, the acoustic analyzer 11 outputs the time-series feature vector 120 of noise-superimposed speech. As shown in FIG. 7, normalized auto-correlation coefficient vector of noise-superimposed speech feature vector of i-th frame is defined to be Xi ($1 \leq i \leq I$, I denotes the number of frames.)

Figure 8:
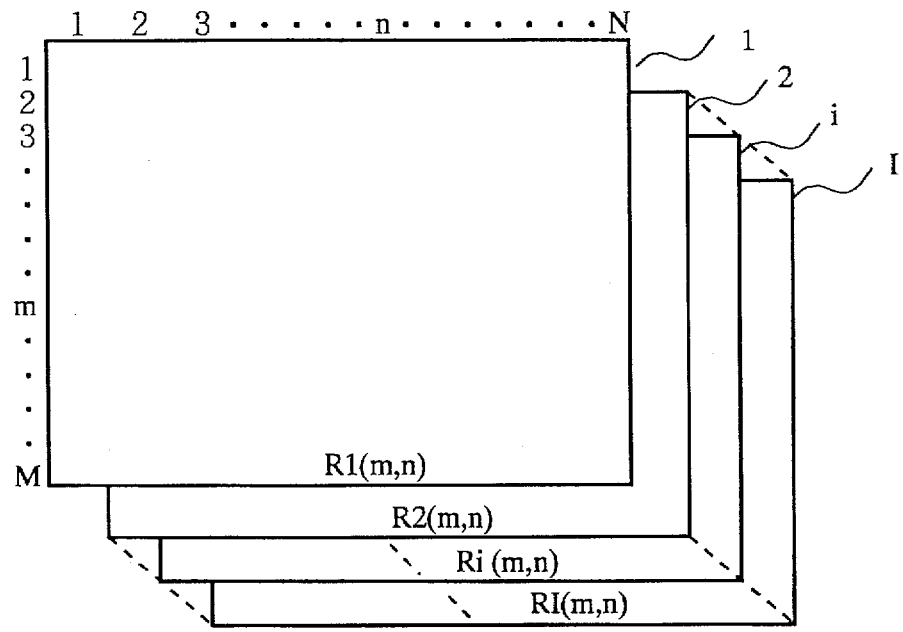
FIG. 8 illustrates an estimated-SN-ratio according to Embodiment 1 of the present invention.

The estimated-SN-ratio calculator 16 calculates estimated-SN-ratio Ri(m, n) of the time-series feature vector 120 of noise-superimposed speech, by using the noise-free speech model 122 stored in the speech model memory 13 and the noise model 121 in the noise model memory 14 as shown in FIG. 8. The estimated-SN-ratio Ri (m, n) can be calculated by the following equation (6) ($1 \leq i \leq I$, $1 \leq m \leq M$, $1 \leq n \leq N$).

[equation (6)]

$$Ri(m,n) = \frac{\sum_{k=-K}^{K} Am(k) \times Vn(k) - \sum_{k=-K}^{K} Am(k) \times Xi(k)}{\sum_{k=-K}^{K} Am(k) \times Xi(k) - \sum_{k=-K}^{K} Am(k) \times Sm(k)}$$

In the equation 6, (k) denotes k-th order component of each vector, and Ri(m, n) is the estimated-SN-ratio in the case of m-th normalized auto-correlation coefficient vector Sm of the noise-free speech model 122 and n-th normalized auto-correlation coefficient vector Vn of the noise model 121 being used for noise-superimposed speech feature vector of i-th frame. Am is a parameter for likelihood, which can be calculated from the normalized auto-correlation coefficient vector Sm of the noise-free speech model 122.

Figure 9:
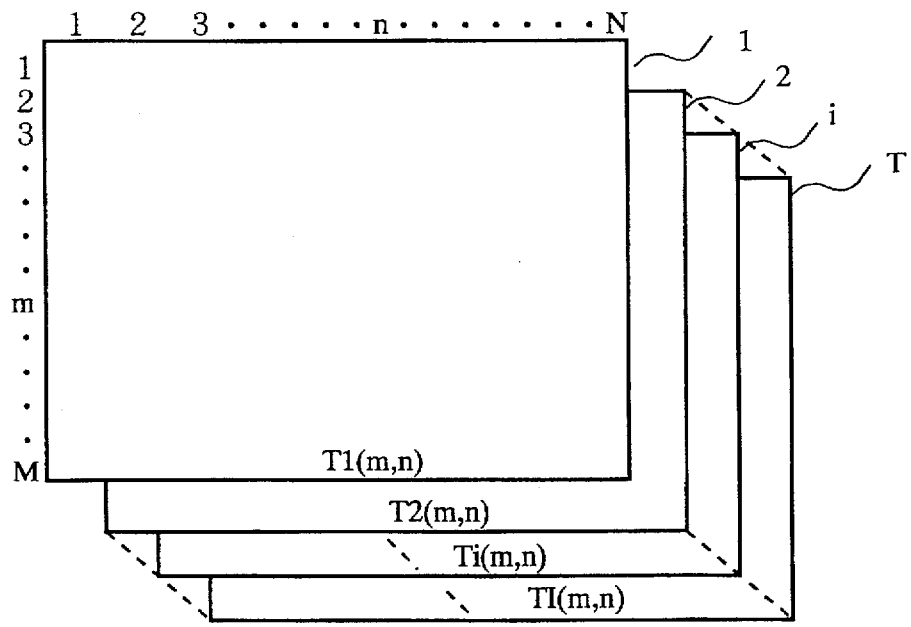
FIG. 9 illustrates a noise-superimposed speech model according to Embodiment 1 of the present invention.

The noise-superimposed-speech-model generator 17, with reference to FIG. 9, generates noise-superimposed speech model Ti(m, n) as weighted sum based on estimated-SN-ratio of the normalized auto-correlation coefficient vector of the noise-free speech model 122 to the normalized auto-correlation coefficient vector of the noise model 121 as shown in the following equation (7). In this case, the noise-superimposed-speech-model generator 17 uses the noise-free speech model 122 stored in the speech model memory 13 and the noise model 121 stored in the noise model memory 14, based on the estimated-SN-ratio data Ri(m, n) ($1 \leq i \leq I$, $1 \leq m \leq M$, $1 \leq n \leq N$) output from the estimated-SN-ratio calculator 16.

[equation (7)]

$$Ti(m,n) = \frac{Ri(m,n)}{1+Ri(m,n)} \times Sm + \frac{1}{1+Ri(m,n)} \times Vn$$

Figure 10:
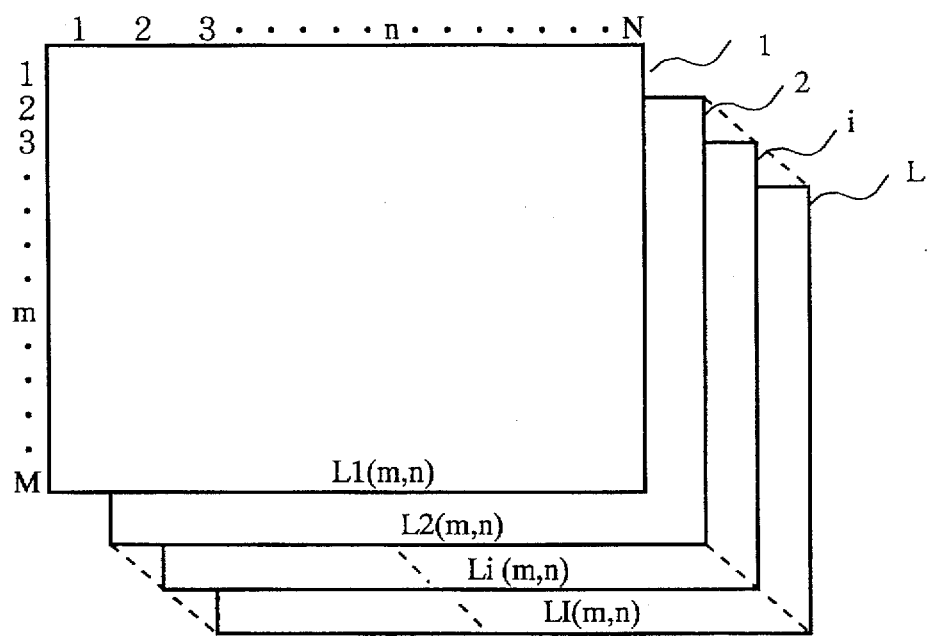
FIG. 10 illustrates likelihoods according to Embodiment 1 of the present invention.

The likelihood calculator 18, with reference to FIG. 10, collates the time-series feature vector 120 of noise-superimposed speech with the noise-superimposed speech model 131 output from the noise-superimposed-speech-model generator 17. Then, the likelihood calculator 18 calculates likelihood $Li(m, n)$ ($1 \leq i \leq I$, $1 \leq m \leq M$, $1 \leq n \leq N$) by the following equation (8).

[equation (8)]

$$Li(m,n) = d(Xi, Ti(m,n))^{-1}$$

$d(*,*)$ in the equation (8) denotes a suitable distance defined by two normalized auto-correlation coefficient vectors. The distance, for instance, is Euclidean Distance obtained by converting each of the two normalized auto-correlation coefficient vectors to LPC cepstrum vector based on LPC analysis.

The weight data calculator 19 of highest likelihood selection type calculates series data (Pi, Qi) of the noise-superimposed speech model 131, which makes likelihood of the time-series feature vector 120 of noise-superimposed speech be maximum, by using likelihood data output from the likelihood calculator. Namely, the series data, which satisfies the following equations (9) and (10) for example, is calculated.

[equation (9)]

$$\sum_{i=1}^{I} Li(Pi,Qi) > \sum_{i=1}^{I} Li(m,n) \, m \neq Pi, n \neq Qi$$

[equation (10)]

$$\prod_{i=1}^{I} Li(Pi,Qi) > \prod_{i=1}^{I} Li(m,n) \, m \neq Pi, n \neq Qi$$

Figure 11:
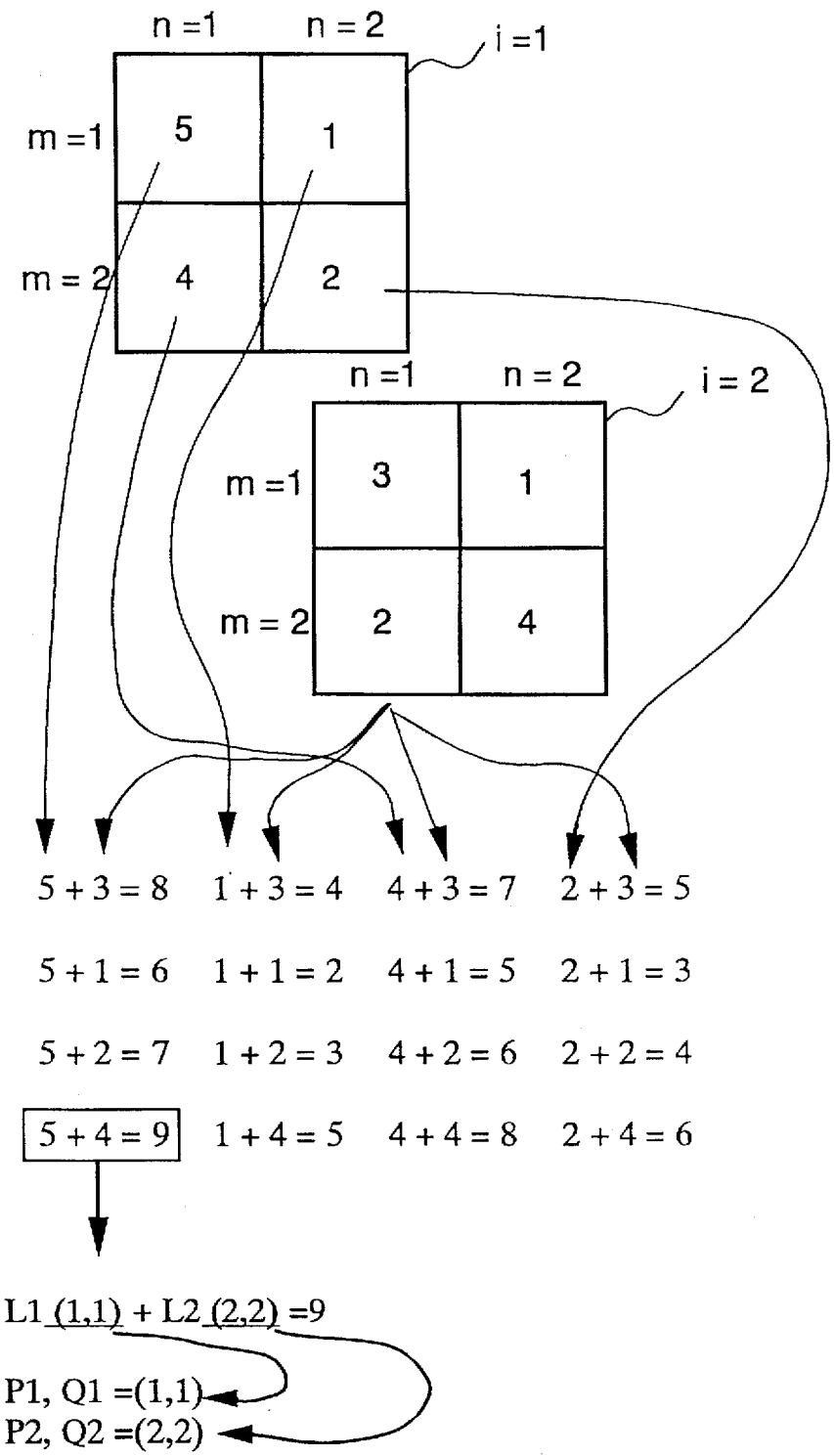
FIG. 11 shows how to obtain series data according to Embodiment 1 of the present invention.

A calculating way of the series data will now be explained with reference to FIG. 11. FIG. 11 shows how to calculate the series data (Pi, Qi) in the case of the likelihood $Li(m, n)$ shown in FIG. 10 being composed of two and two, that is M×N=2×2, and there being first and second analysis frames (i=1, i=2)(I=2). When the likelihood is obtained by way of FIG. 11, sums of all the combinations of the likelihoods obtained from the first and second analysis frames are calculated and one combination having the maximum sum is selected, by the equation (5). In FIG. 11, 5+4=9 is maximum. Accordingly, in the case of likelihood L1(1,1)+L2(2, 2)=9, the sum is maximum. Thus, (P1, Q1)=(1, 1) and (P2, Q2)=(2, 2) are obtained as the series data.

Based on this series data, weight data $Gi(m, n)$ is calculated by the following equation (11).

[equation (11)]

$$Gi(m,n) = \begin{bmatrix} 1, m = Pi, n = Qi \\ 0, m \neq Pi, n \neq Qi \end{bmatrix}$$

Figure 12:
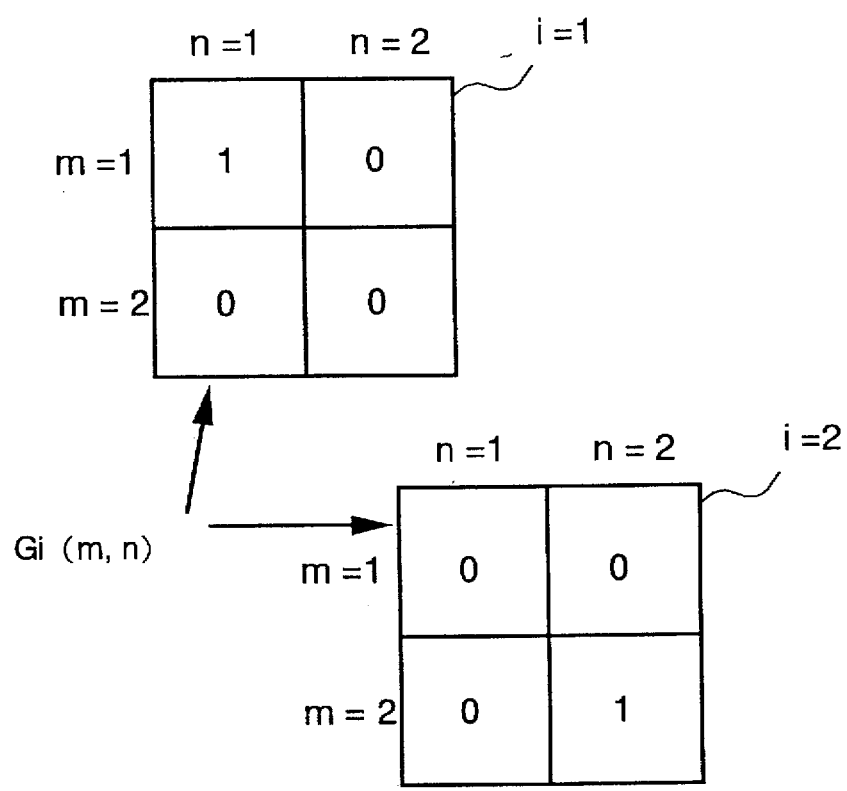
FIG. 12 shows weight data according to Embodiment 1 of the present invention.

FIG. 12 shows weight data calculated from concrete examples of FIG. 11. In the first analysis frame (i=1), only the weight data corresponding to the series data (1, 1) becomes 1 and values of other weight data become 0. In the second analysis frame (i=2), only the weight data corresponding to the series data (2, 2) becomes 1 and values of other weight data become 0.

The noise spectrum generator 20 generates the estimated superimposed-noise spectrum 5 by using the weight data output from the weight data calculator 19 of highest likelihood selection type, estimated-SN-ratio data calculated by the estimated-SN-ratio calculator 16, the time-series feature vector 120 of noise-superimposed speech, and power spectrum of the noise model 121 stored in the noise model memory 14.

First, regarding the combination of i, m, and n whose weight data $Gi(m, n)$ is not 0 but 1, superimposed-noise power spectrum $Zi(m, n)$ is calculated in the following equation (12), by using the estimated-SN-ratio data $Ri(m, n)$, noise power data $Ui$ in a noise-superimposed speech feature vector of the i-th frame of the time-series feature vector 120 of noise-superimposed speech, and normalized power spectrum $Wn$ stored in the noise model memory 14. Therefore, $Zi(m, n)$ is a power spectrum, whose general form is similar to the normalized power spectrum $Wn$ of the noise model 121 and which has noise power in the i-th noise-superimposed speech feature vector depending on the estimated-SN-ratio data $Ri(m, n)$.

[equation (12)]

$$Zi(m,n) = \frac{Ui}{1 + Ri(m,n)} \times Wn$$

In FIG. 12, there are two cases for the combination of i, m and n to have 1 as the weight data. One case is i=1, m=1, n=1, and the other is i=2, m=2, n=2. Accordingly, superimposed-noise power spectrum is calculated for two cases of Z1(1, 1) and Z2(2, 2). Regarding other cases, the superimposed-noise power spectrum is not calculated because the weight data is 0.

Secondly, relating to all the combinations of m and n per i, weighted average of the superimposed-noise power spectrum $Zi(m, n)$ based on the weight data $Gi(m, n)$ is calculated by the following equation (13). Then, calculated Yi is output as the estimated superimposed-noise spectrum 5.

[equation (13)]

$$Yi = \frac{\sum_{i \leq m \leq M, 1 \leq n \leq N} Gi(m,n) \times Zi(m,n)}{\sum_{1 \leq m \leq M, 1 \leq n \leq N} Gi(m,n)}$$

The above calculation of weighted average will have important meaning in Embodiments 2 and 3 stated later. Since the weight data is 1 in this Embodiment 1, the superimposed-noise power spectrum $Zi(m, n)$ is intactly output. In the concrete example of FIG. 12, the power spectrum $Zi(m, n)$ to be output is as follows.

Y1=Z1(1, 1)

Y2=Z2(2, 2)

After the estimated superimposed-noise spectrum 5 being obtained, the same recognition-collation process as the conventional art is performed to obtain a recognition result.

By the above processes, calculation for obtaining likelihood, between the time-series feature vector 120 of noise-superimposed speech and the noise-free speech model 122 wherein inclusion of noise designated by the noise model 121 is taken into account, is performed. Estimation for the power spectrum of superimposed noise, per analysis frame of the noise-superimposed input speech, is also performed depending upon the likelihood-highest-reference. Accordingly, an estimated superimposed-noise spectrum which does not easily get the effect of change of superimposed noise, such as a change generated in unsteady noise circumstances and a change generated by distance varying between the microphone for inputting speech and a noise source, can be obtained. Namely, deterioration of recognition performance can be suppressed.

Determining the series data satisfying the equations (9) and (10) can be substituted for finding a combination of m and n, per i, satisfying the equation (14) because the following two configurations are applied. One configuration is that the noise-free speech model 122 is composed on the supposition that a normalized auto-correlation coefficient vector, corresponding to a typical power spectrum of noise-free speech, can be observed at equivalent probability in the noise-free speech. The other configuration is that the noise model 121 is composed on the supposition that a normalized auto-correlation coefficient vector, corresponding to typical power spectrum of noise, can be observed at equivalent probability in the noise.

[equation (14)]

$$Li(Pi,Qi) > Li(m,n) \; m \neq Pi, n \neq Qi$$

How to determine the above series data will now be stated with reference to FIG. 11. The equation (14) is for finding the highest likelihood per each analysis frame i. Accordingly, in the case of i=1 in FIG. 11, it is proper to choose likelihood 5, being the highest, out of likelihoods 5, 1, 4 and 2. In the case of i=2 in FIG. 11, it is proper to choose likelihood 4, being the highest, out of likelihoods 3, 1, 2 and 4. Although the same likelihood as previously stated with reference to FIG. 11 is selected and the same series data (1, 1) and (2, 2) as previously stated with reference to FIG. 11 is determined in this case, another series data can be determined depending upon the situation.

As has been stated, it is necessary to wait for likelihoods of all the analysis frames having been calculated in the cases of the equations (9) and (10). On the other hand, according to the equation (14), it is not necessary to wait for likelihoods of all the analysis frames having been calculated because the highest likelihood can be determined per analysis frame.

Using this procedure, estimated superimposed-noise spectrum can be estimated per analysis frame of noise-superimposed input speech. Accordingly, processes up to the feature vector calculator 6 can be sped up by performing pipeline process and so forth.

Processing procedure of this embodiment will now be described.

(1) Relating to an analysis frame of an input speech, estimated-SN-ratios of all the combinations of the noise model and the noise-free speech model are calculated.

(2) Relating to the each combination, the noise model is superimposed on the noise-free speech model based on the calculated estimated-SN-ratio.

(3) Distances between the analysis frames of the input speech and the noise-superimposed speeches obtained in (2) are calculated, and a combination of the noise model and the noise-free speech model, having the shortest distance, is selected.

(4) Noise power is calculated based on the estimated-SN-ratio of the combination selected in (3) and power of the corresponding analysis frame of the input speech.

(5) Spectrum subtraction process is performed on supposition that a power spectrum corresponding to the noise model of the combination selected in (3) is superimposed, by using the power calculated in (4), on the analysis frame of the input speech.

(6) Procedures (1) through (5) are performed for all the analysis frames of the input speech.

By the above procedures, selection for noise model of superimposed noise and power calculation are performed based on likelihood-highest-reference, per analysis frame of the input speech. This likelihood-highest-reference is calculated by collating with the noise-free speech model wherein noise-superimposing is taken into account. Accordingly, noise elimination which does not easily get the influence of unsteady noise or change of estimated-SN-ratio can be performed.

Regarding the noise-free speech model 122 of the present embodiment, it can be not only the normalized auto-correlation coefficient vector corresponding to the above plural typical power spectra, but also a model composed by mutually connecting all the syllable models used in Japanese.

In the case of continuous distribution type HMM (Hidden Marcov Model) being used as the syllable model, normalized auto-correlation coefficient vector corresponding to a mean vector in the HMM is calculated per mean vector and stored in the speech model memory as the noise-free speech model 122.

The calculation of the estimated-SN-ratio in the equation (6) is performed by using the corresponding normalized auto-correlation coefficient vector. The generation of the noise-superimposed speech model is performed as follows. According to the equation (7), auto-correlation coefficient vector obtained by weighted sum based on the estimated-SN-ratio of normalized auto-correlation coefficient vector of the noise-free speech model 122 to normalized auto-correlation coefficient vector of the noise model 121, is acoustically analyzed. Then, the generation of the noise-superimposed speech model is performed by substituting the analysis result for the mean vector in the HMM. The likelihood of the equation (8) is obtained by using output probability in the HMM. The series data (Pi, Qi) of the weight data calculator 19 of highest likelihood selection type can be calculated by performing Viterbi calculation in HMM instead of performing the equations (9) and (10).

Owing to the above, accuracy of the noise-free speech model 122 representing speech without noise is enhanced and estimation accuracy of superimposed noise is also improved. Namely, the speech recognition in noisy circumstances having higher accuracy can be realized.

Embodiment 2.

Figure 13:
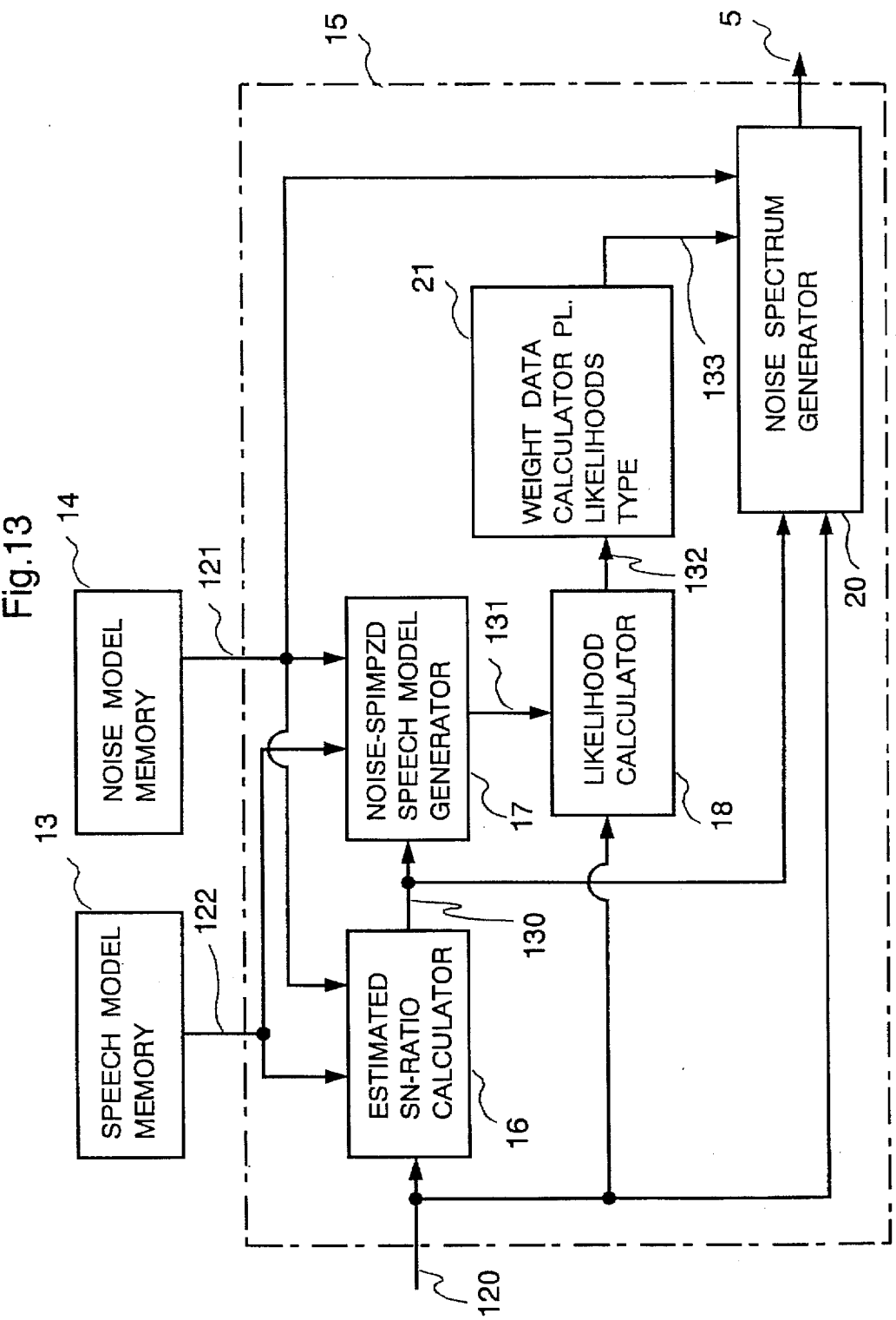
FIG. 13 is a block diagram showing a configuration of a superimposed-noise estimating unit according to Embodiment 2 of the present invention.

FIG. 13 is a block diagram showing a configuration of the superimposed-noise estimating unit 15 according to another embodiment of the present invention. A respect differing from Embodiment 1 is that a weight data calculator 21 of plural likelihoods type is used instead of the weight data calculator 19 of highest likelihood selection type.

Now, operation will be described. The weight data calculator 21 of plural likelihoods type sorts the likelihood Li(m, n) based on $1 \leq m \leq M$ and $1 \leq n \leq N$, per noise-superimposed speech feature vector of the time-series feature vector 120 of noise-superimposed speech, using likelihood data from the likelihood calculator 18. In order of highness of likelihood, series data (Pi(j), Qi(j)) of the combination of m and n corresponding to the likelihood is calculated. j denotes the order of highness, and thus Pi(j) {1, 2, ..., M}, Qi(j) {1, 2, ..., N}.

According to the series data, weight data Gi(m, n) is calculated by the following equation (15). H in the equation (15) denotes the number of higher likelihoods which are used for generating estimated superimposed-noise spectrum.

[equation (15)]

$$Gi(m,n) = \begin{cases} 1/H_i(m,n) \in [(Pi(j),Qi(j))|1 \leq j \leq H] \\ [0_i(m,n) \; [(Pi(j),Qi(j))|1 \leq j \leq H] \end{cases}$$

Figure 14:
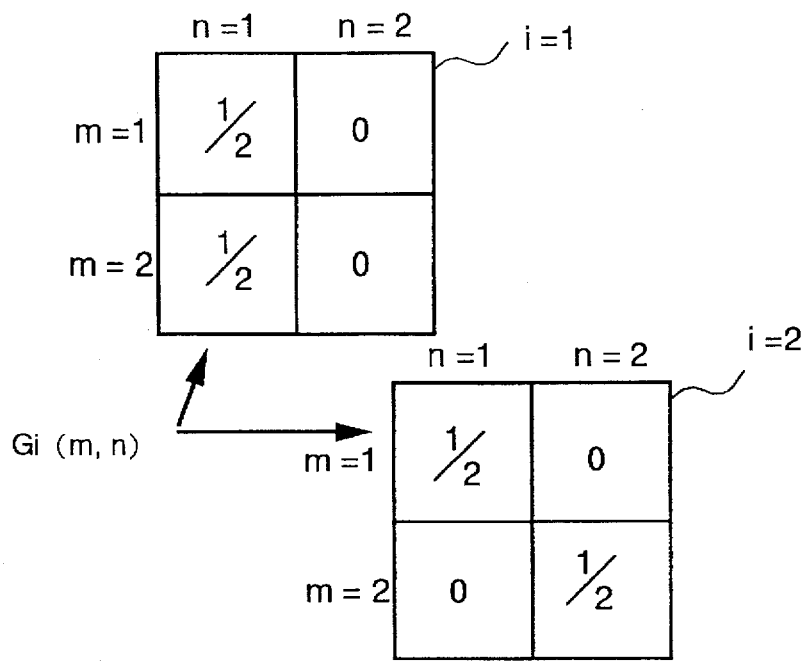
FIG. 14 shows weight data according to Embodiment 2 of the present invention.

A concrete example of this embodiment is illustrated in FIG. 14. FIG. 14 shows weight data in the case of the likelihood as shown in FIG. 11 being calculated and H, the number of higher likelihoods, being two (H=2). Regarding the case of the first analysis frame of FIG. 11 (i=1), when the likelihoods are arranged in order of highness they become 5, 4, 2 and 1. Half of the weight data is equivalently allocated for each of the two higher likelihoods 5 and 4. Regarding the case of the second analysis frame of FIG. 11 (i=2), when the likelihoods are arranged in order of highness, they become 4, 3, 2 and 1. Then, half of the weight data is equivalently allocated for each of the higher likelihoods 4 and 3.

When half of the weight is equivalently allocated as stated above, an average of two superimposed-noise power spectra is calculated according to the equation (13) and output as an estimated superimposed-noise spectrum Yi.

Namely, an estimated superimposed-noise spectrum wherein plural combinations of m and n having high likelihoods are applied, can be generated. Accordingly, the deterioration of accuracy of estimated superimposed-noise spectrum caused by error between the noise model 121 and an actual noise or error between the noise-free speech model 122 and an actual noise, can be suppressed. Thus the recognition accuracy can be enhanced.

Figure 15:
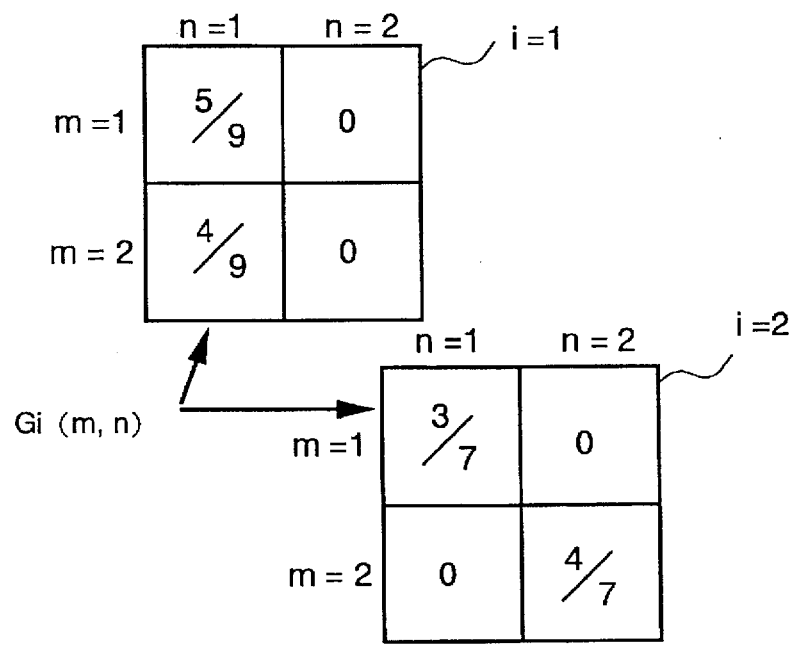
FIG. 15 shows weight data according to Embodiment 2 of the present invention.

The equation for calculating the weight data is not limited to the way of equation (15). It is also acceptable to apply the way of making the weight be large in proportion to likelihood, as shown in FIG. 15.

Embodiment 3.

Figure 16:
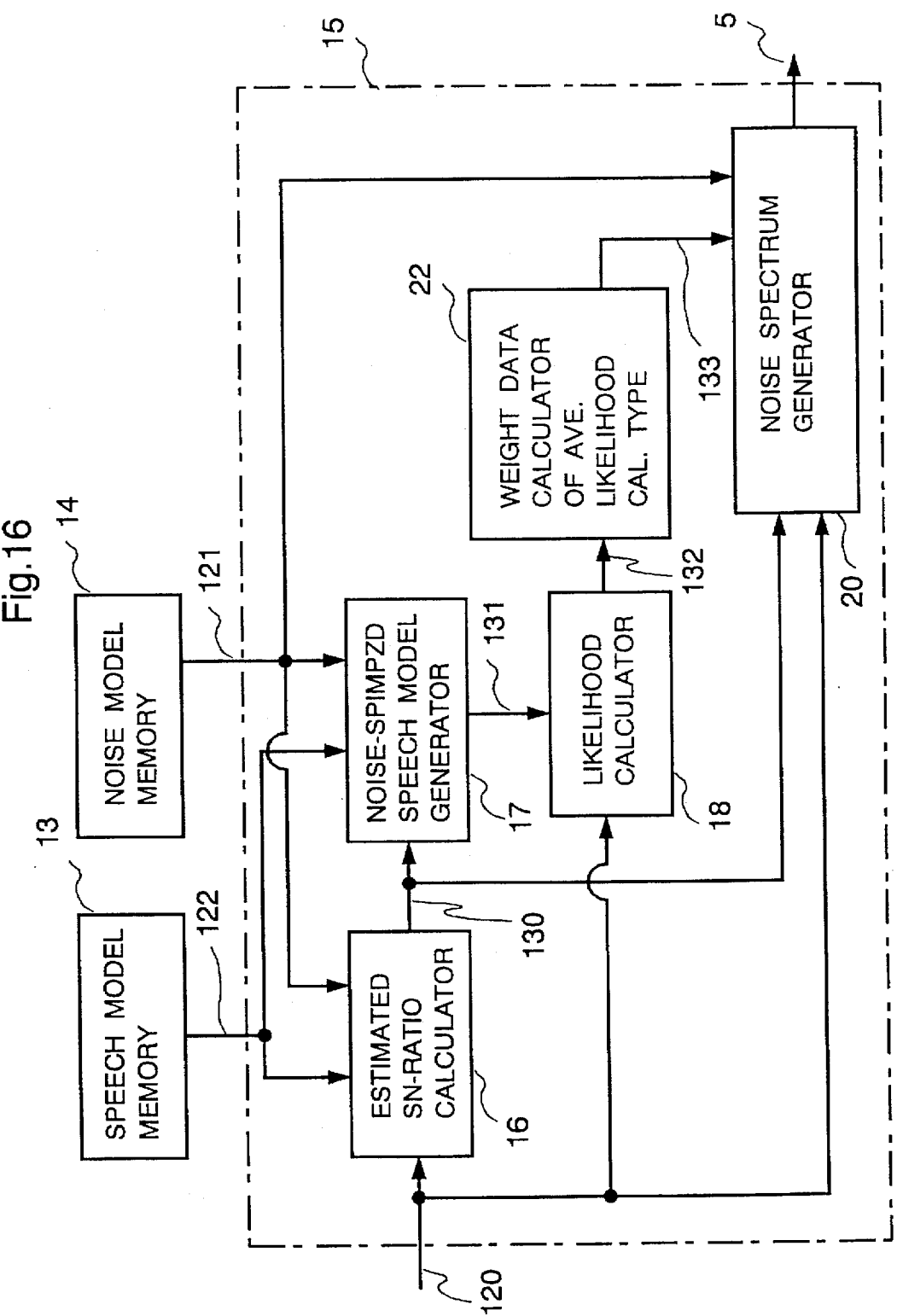
FIG. 16 is a block diagram showing a configuration of a superimposed-noise estimating unit according to Embodiment 3 of the present invention.

FIG. 16 is a block diagram showing a configuration of the superimposed-noise estimating unit 15 according to another embodiment of the present invention. A respect differing from Embodiment 1 is that a weight data calculator 22 of average likelihood calculation type is used instead of the weight data calculator 19 of highest likelihood selection type.

Operation will now be described. The weight data calculator 22 of average likelihood calculation type sorts the likelihood Li(m, n) based on $1 \leq m \leq M$ with respect to optional n per noise-superimposed speech feature vector of the time-series feature vector 120 of noise-superimposed speech, using likelihood data from the likelihood calculator 18. In order of highness of likelihood, series data Pin(j) {1, 2, . . . , M} of m corresponding to the likelihood is calculated. j denotes the order.

An average likelihood Ein per n can be obtained by averaging Li(Pin(j), n) which satisfies $J \leq C$. C denotes the number of higher likelihoods used for calculating the average likelihood.

In $1 \leq n \leq N$, when n which makes Ein be maximum is defined to be nmax, weight data Gi(m, n) can be obtained by the following equation (16).

[equation (16)]

$$Gi(m,n) = \begin{bmatrix} 1/C, m \in [Pin(j) | 1 \leq j \leq C], n = nmax \\ 0, others \end{bmatrix}$$

Figure 17:
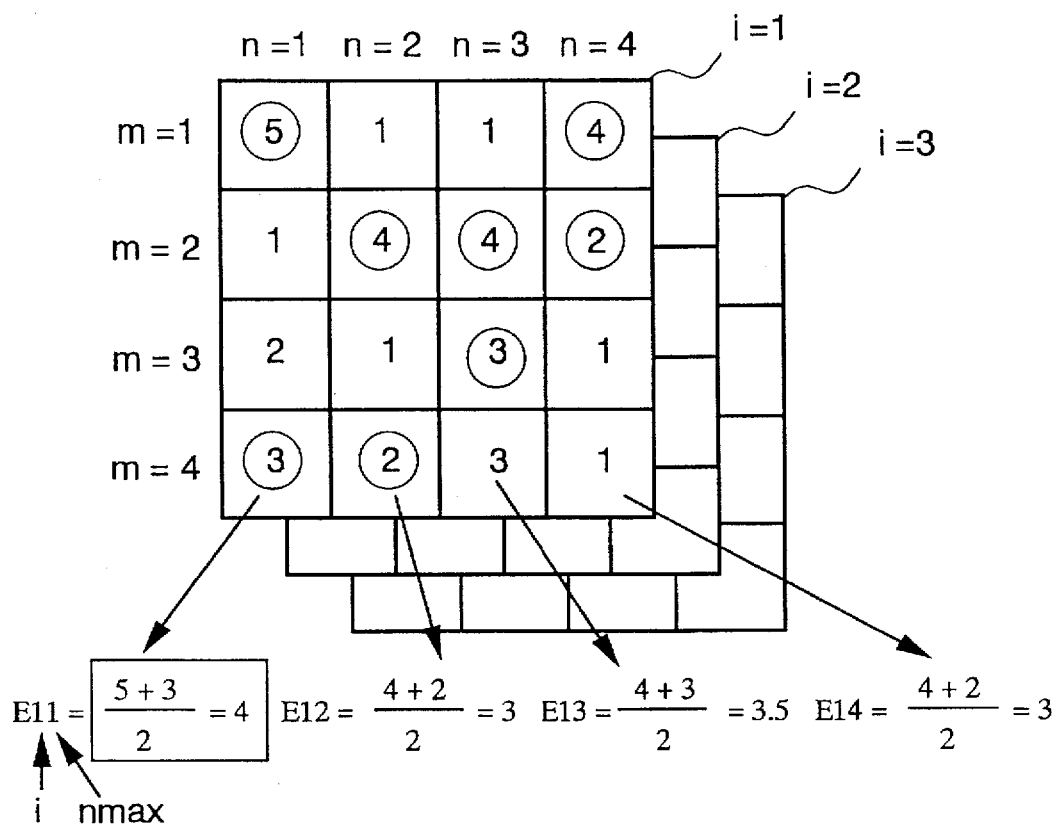
FIG. 17 shows how to obtain the maximum of average likelihoods according to Embodiment 3 of the present invention.
Figure 18:
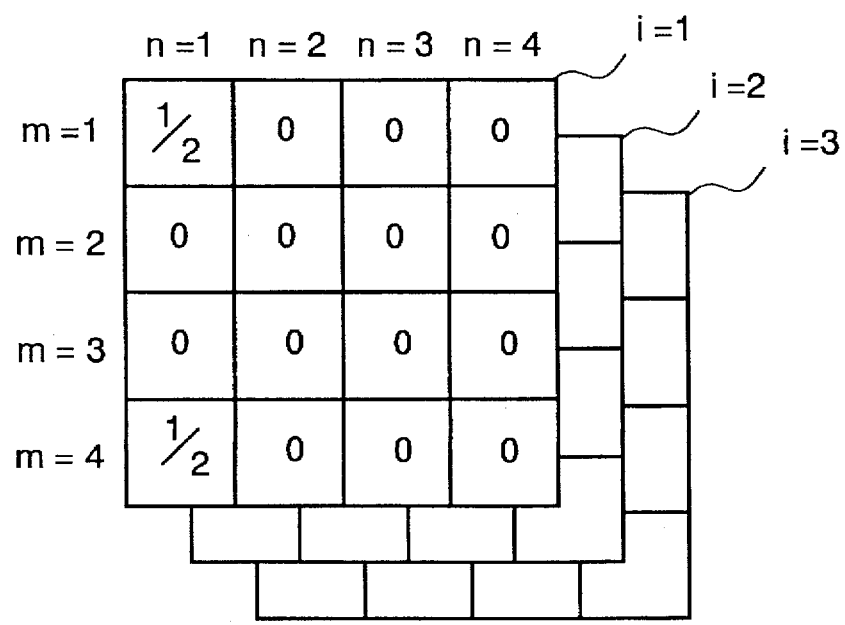
FIG. 18 shows weight data according to Embodiment 3 of the present invention.

A concrete calculating way for weight data in Embodiment 3 will now be stated with reference to FIG. 17. FIG. 17 shows a calculated likelihood. The C, the number of higher likelihoods, is defined to be two in here (C=2). In the case of n=1, two of higher likelihoods are 5 and 3, and the average of them is 4. In the case of n=2, two of higher likelihoods are 4 and 2, and the average of them is 3. Similarly, in the case of n=3, the average is 3.5, and when n=4 the average is 3. Accordingly, the average value becomes maximum when n=1, so that the noise model of n=1 is determined to be used. Then, weight data, being a reciprocal number of the C, is calculated as shown in FIG. 18.

Although the case that the weight is equivalently divided into two is shown in here, the equation for calculating the weight data is not limited to the equation (16). To make the weight be large in proportion to likelihood is also acceptable though it is not shown in figures.

The average likelihood is calculated by using plural higher likelihoods in each combination of the each noise model 121 and the noise-free speech model 122. Since the noise model 121 corresponding to the maximum average likelihood is selected, the deterioration of accuracy of estimated superimposed-noise spectrum caused by error between the noise model 121 and an actual noise or error between the noise-free speech model 122 and an actual noise, can be suppressed, and thus the recognition accuracy can be enhanced.

Experiments.

(1) Experimental Conditions

The method of eliminating noise stated in Embodiment 1 was evaluated by a recognition experiment for words uttered by specific speakers, based on phoneme HMM of continuous distribution type. The experiment whose conditions are shown in FIG. 19 was performed for speeches of one hundred city names from a gazetteer, on which PINK noise and unsteady noise in the plant had been superimposed. The noise-superimposed speech was obtained by adding noise data onto noise-free speech data on the computer process. The estimated-SN-ratio was defined by a ratio of an average power of speech data excluding noise part to an average power of noise data.

The speech model was obtained by clustering a speech part of the speech for study based on LBG (Linde, Buzo, Gray) algorithm and averaging normalized auto-correlation coefficient of each cluster. The noise model of each noise was obtained by clustering each of all the noise data based on LBG algorithm and calculating an average of normalized auto-correlation coefficient and an average of power spectrum of each category. A scale for distance in the above clusterings was Euclidean Distance of LPC cepstrum.

One hundred city names from a gazetteer were used for the recognition experiment. For the purpose of comparing with the method of the embodiment of the present invention, spectrum subtraction (SS) method wherein an average of power spectra of ten frames just before the speech was defined to be an estimated superimposed-noise, was used as the conventional method, in this recognition experiment.

(2) Evaluation Using PINK Noise Superimposed Speech

Figure 20:
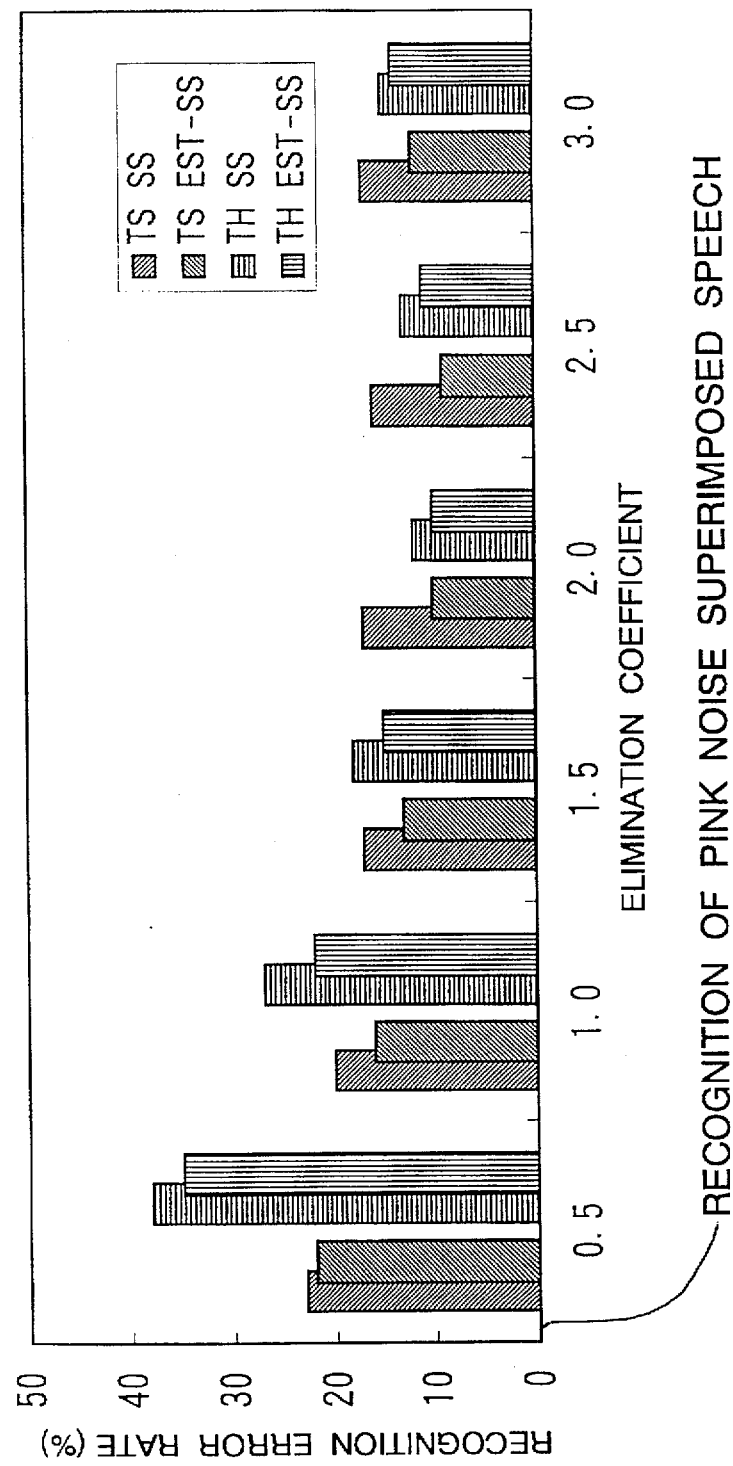
FIG. 20 is a graph showing recognition result of PINK noise superimposed speech according to the present invention.

The recognition evaluation was performed by using speech data wherein steady PINK noise was superimposed. The estimated-SN-ratio was 10 dB. Centroid in the case of cluster number being one was used as the noise model, and Centroid in the case of cluster number being sixty-four was used as the speech model. Recognition-error-rate with respect to each speaker (TH, TS) in the case of noise eliminating coefficient in the spectrum subtraction (SS) being changed is shown in FIG. 20. In FIG. 20, SS denotes the conventional method and EST-SS denotes the noise eliminating method stated in Embodiment 1.

According to FIG. 20, it is noticed that the noise eliminating method stated in Embodiment 1 has a similar or some better recognition performance than the conventional method regardless of the speaker and the eliminating coefficient, and that the error rate becomes the lowest when the eliminating coefficient is 2.0.

From the described above, it is confirmed that the noise eliminating method stated in Embodiment 1 works efficiently for the speech data wherein steady PINK noise is superimposed.

(3) Evaluation Using Unsteady Noise Superimposed Speech

This experiment was performed by using speech data wherein unsteady noise, which had been recorded at the check line in the automobile plant, was superimposed. Centroid in the case of cluster number being four was used as the noise model and as the speech model, the common one to the previous experiment was used.

Figure 21:
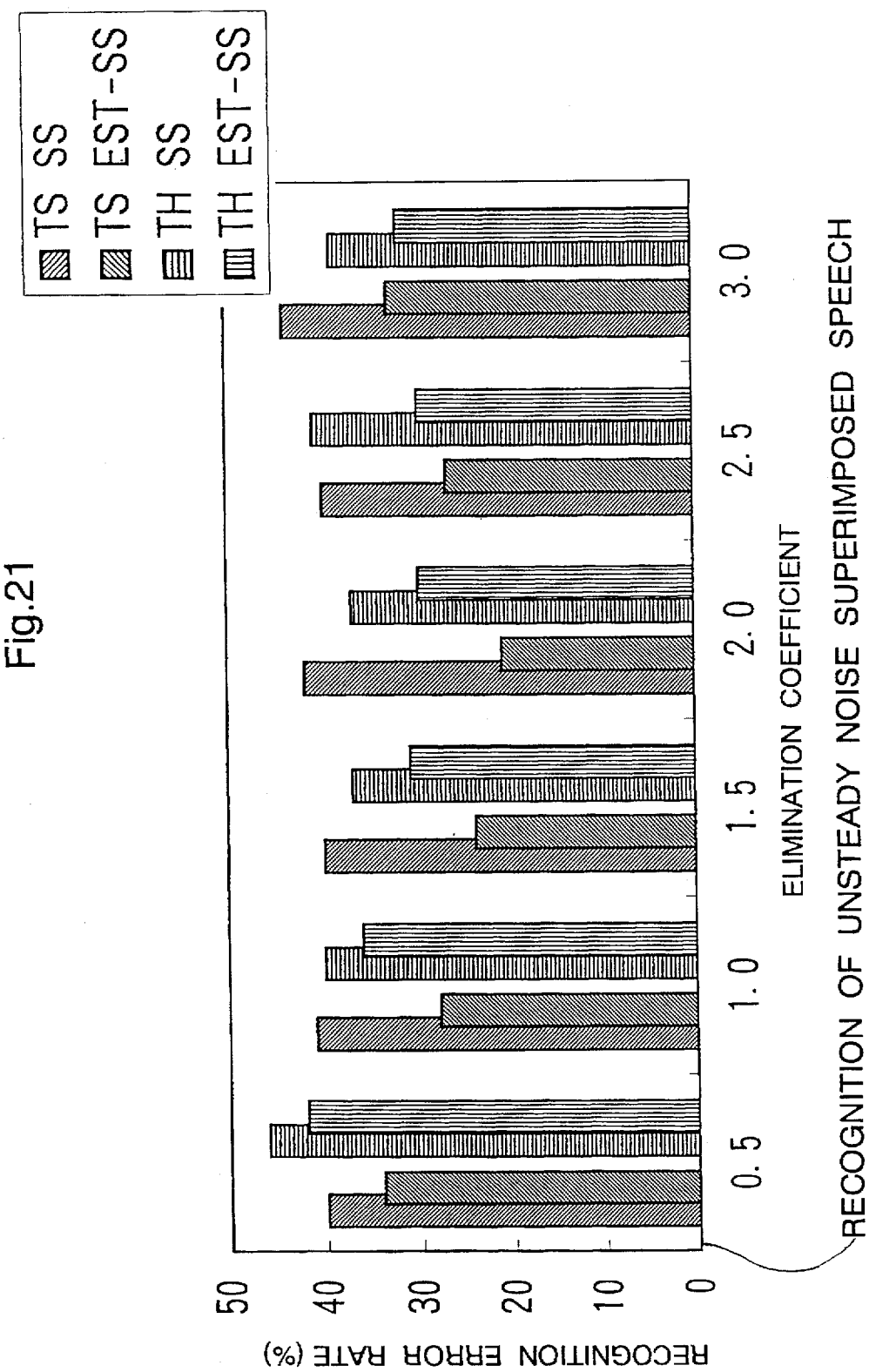
FIG. 21 is a graph showing recognition result of unsteady noise superimposed speech according to the present invention.

FIG. 21 shows a result of the recognition experiment, that is recognition-error-rate for the unsteady noise superimposed speech data whose estimated-SN-ratio was 10 dB. References and axes in FIG. 21 indicate the same as FIG. 20. Comparing with the result of the previous experiment using the PINK noise, it is noticed that the performance under the unsteady noise is extraordinarily degraded because the recognition-error-rate is increased regardless of the way, speaker and the eliminating coefficient though the estimated-SN-ratio was the same. Regarding the noise eliminating method stated in Embodiment 1, it has a better recognition accuracy than the conventional method, regardless of the speaker and the eliminating coefficient. Namely, it is obvious that the noise eliminating method stated in Embodiment 1 has efficiency even under the unsteady noise.

Figure 22:
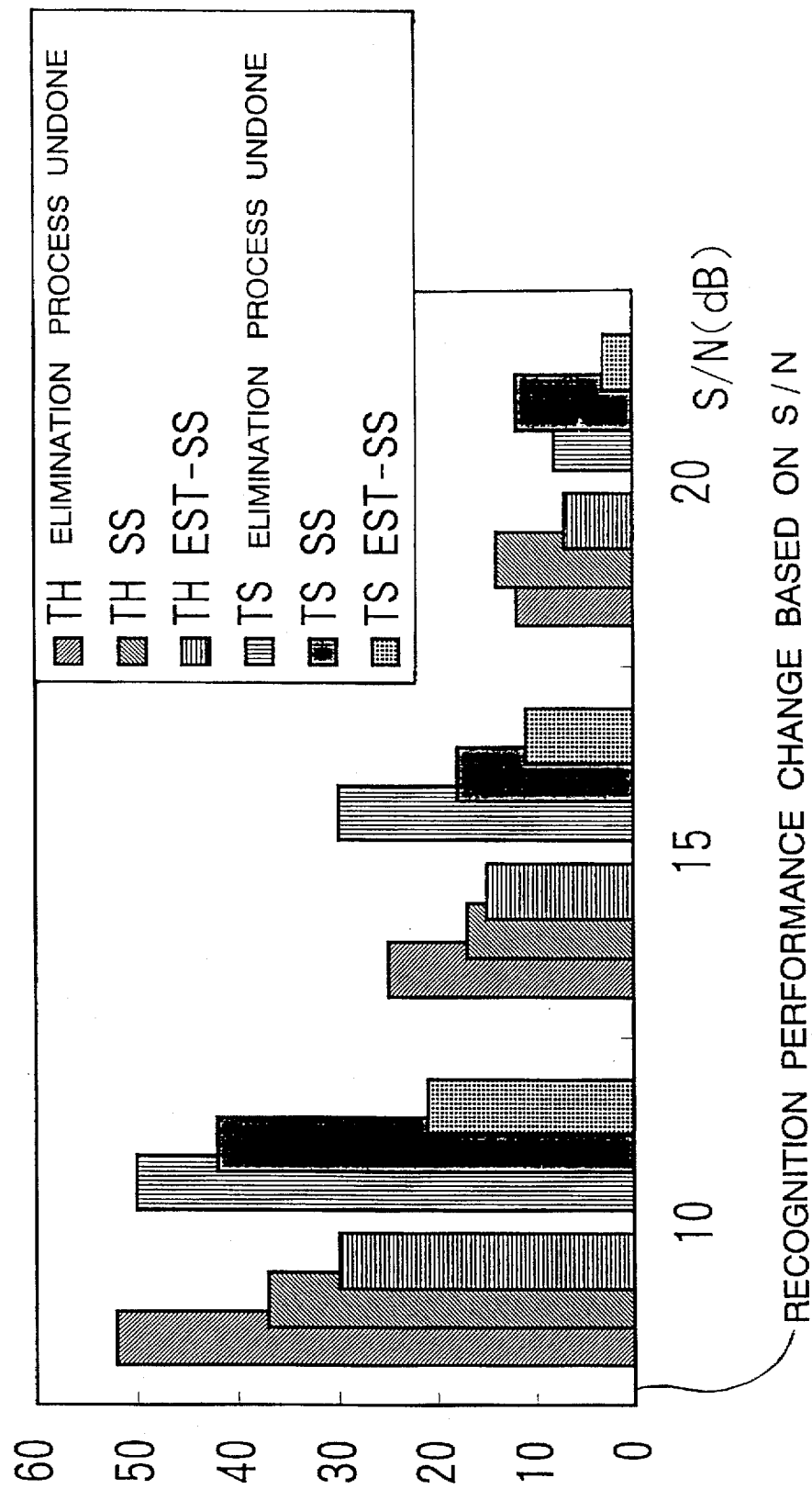
FIG. 22 is a graph showing recognition performance change based on an estimated-SN-ratio according to the present invention.
Figure 23:
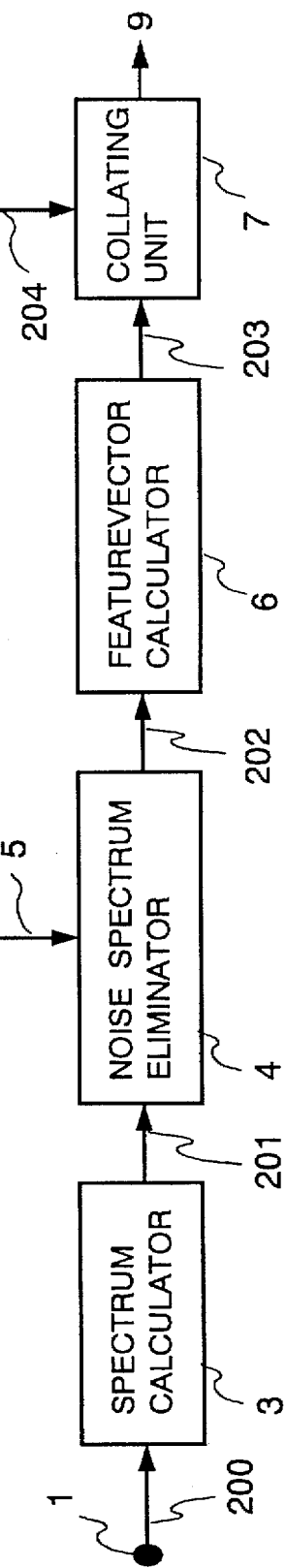
FIG. 23 is a block diagram showing a configuration of a conventional speech recognition apparatus in noisy circumstances wherein a spectrum subtraction method is used.
Figure 24:
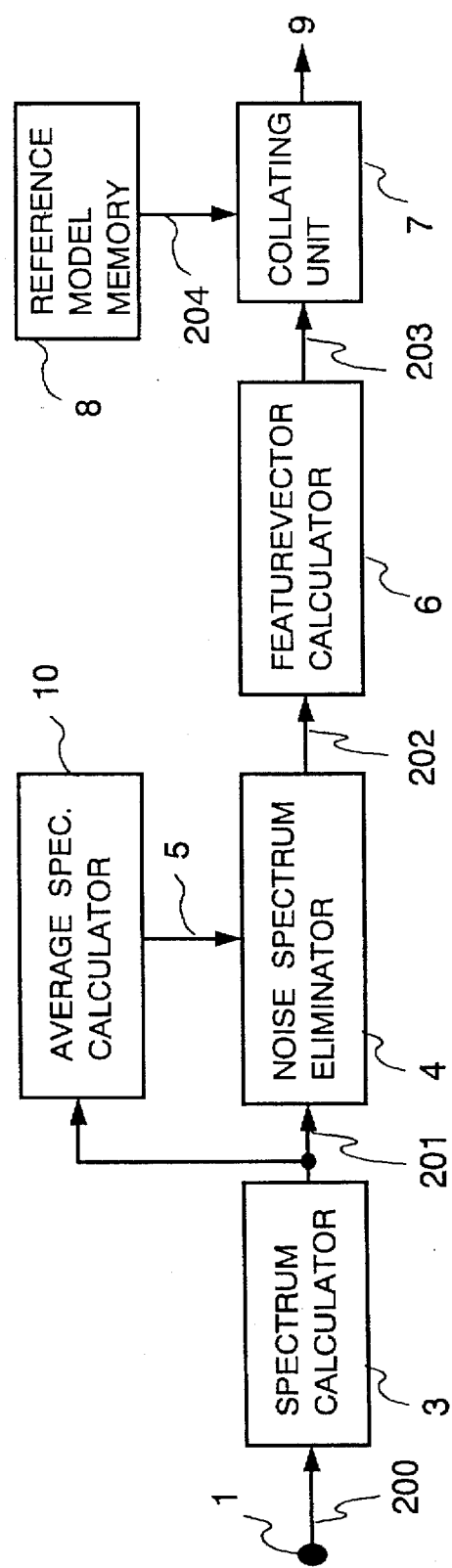
FIG. 24 is a block diagram showing a configuration of a conventional speech recognition apparatus in noisy circumstances.
Figure 25:
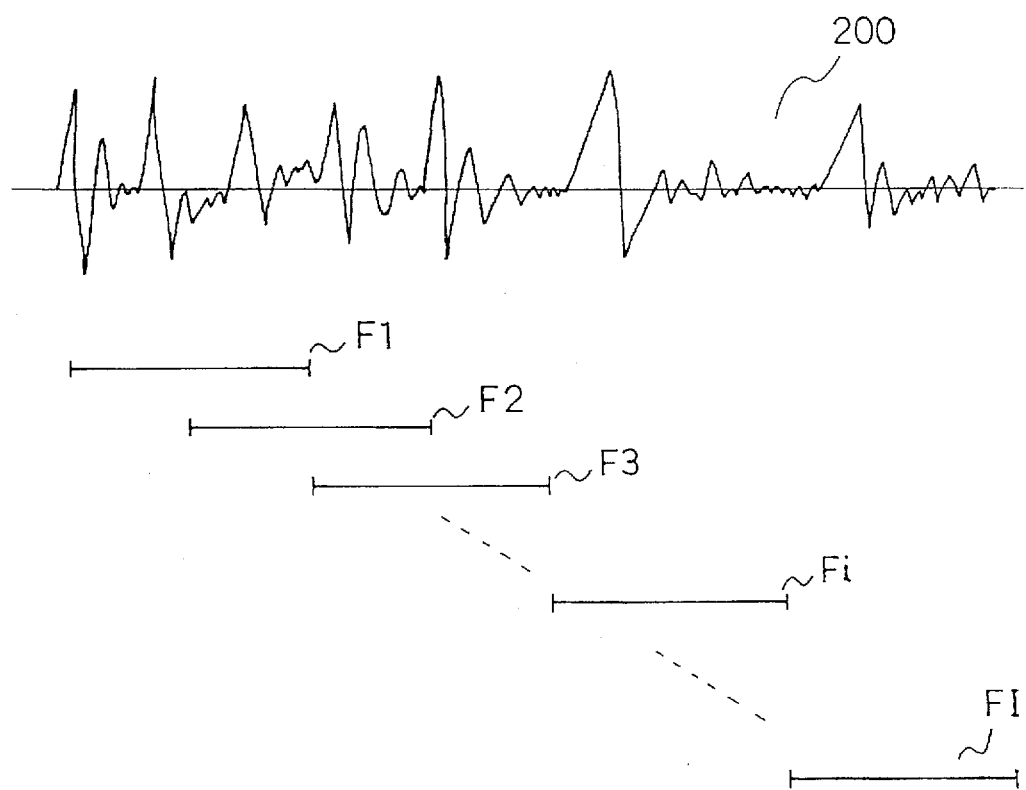
FIG. 25 illustrates relation between an input noise-superimposed speech signal and an analysis frame.
Figure 26:
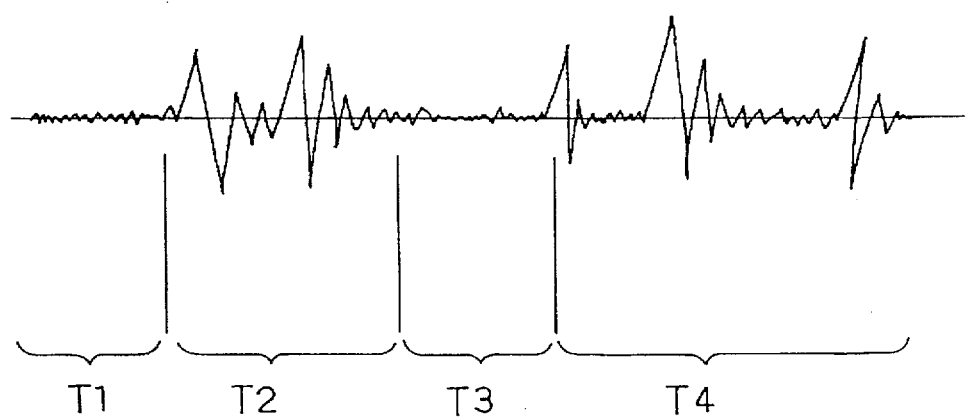
FIG. 26 illustrates relation between speech sections and noise sections.

Then, a recognition experiment in the case of the estimated-SN-ratio of the speech data being changed was performed. FIG. 22 shows the result of this experiment, in which the horizontal axis indicates the estimated-SN-ratio. Since the error rate becomes the lowest when the eliminating coefficient is 2.0 according to the previous experiment, 2.0 is used for the present experiment as the eliminating coefficient. Recognition performance in the case of noise eliminating process being not performed at all is also shown in FIG. 22. It is noticed that the noise eliminating method stated in Embodiment 1 works efficiently regardless of the estimated-SN-ratio.

(4) Result

As stated above, estimating superimposed-noise using the noise model and the noise-free speech model and eliminating the noise on the power spectrums was experimented as the recognition method of the noise-superimposed speech. Consequently, the efficiency of this method has been confirmed by the present experiment using the speech data of one hundred city names on which PINK noise and unsteady noise in the plant had been superimposed.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A speech recognition apparatus for recognizing an input speech under noisy circumstances comprising:

a noise model memory for storing a noise model;

a speech model memory for storing a noise-free speech model;

a reference model memory for storing a plurality of speech models for collation;

an acoustic analyzer for receiving the input speech, acoustically analyzing a noise-superimposed speech signal of the input speech, and outputting a time-series feature vector of noise-superimposed speech;

a superimposed-noise estimating unit for estimating a superimposed noise based on the time-series feature vector of noise-superimposed speech by using the noise model stored in the noise model memory and the noise-free speech model stored in the speech model memory, and outputting an estimated superimposed-noise spectrum;

a spectrum calculator for receiving the input speech, analyzing a spectrum of the noise-superimposed speech signal of the input speech, and outputting a time-series noise-superimposed speech spectrum;

a noise spectrum eliminator for eliminating a spectrum component of a noise speech in the noise-superimposed speech signal for the time-series noise-superimposed speech spectrum output from the spectrum calculator by using the estimated superimposed-noise spectrum output from the superimposed-noise estimating unit, and outputting a time-series noise-eliminated speech spectrum;

a feature vector calculator for calculating a first feature vector from the time-series noise-eliminated speech spectrum and outputting a time-series feature vector of noise-eliminated speech; and a collating unit for collating the time-series feature vector of noise-eliminated speech with the plurality of speech models for collation stored in the reference model memory, selecting a speech model out of the plurality of speech models for collation, whose likelihood is highest, and outputting the speech model as a recognition result.

2. The noise recognition apparatus of claim 1, wherein the superimposed-noise estimating unit includes:

an estimated-SN(Signal Noise)-ratio calculator for inputting the time-series feature vector of noise-superimposed speech output from the acoustic analyzer, calculating an estimated-SN-ratio for each noise-superimposed speech feature vector by using the noise model stored in the noise model memory and the noise-free speech model stored in the speech model memory, and outputting the estimated-SN-ratio;

a noise-superimposed speech model generator for synthesizing the noise model stored in the noise model memory with the noise-free speech model stored in the speech model memory based on the estimated-SN-ratio, generating a noise-superimposed speech model and outputting the noise-superimposed speech model;

a likelihood calculator for collating the noise-superimposed speech model with the noise-superimposed speech feature vector, which was used for calculating the estimated-SN-ratio in the estimated-SN-ratio calculator, calculating a likelihood between the noise-superimposed speech model and the noise-superimposed speech feature vector, and outputting the likelihood as first collation data;

a weight data calculator for calculating first weight data for a combination of the each noise-superimposed speech feature vector, the noise model and the noise-free speech model by using the first collation data, and outputting the first weight data; and a noise spectrum generator for generating an estimated superimposed-noise spectrum by using the first weight data, the estimated-SN-ratio output from the estimated-SN-ratio calculator, the time-series feature vector of noise-superimposed speech output from the acoustic analyzer, and the noise model stored in the noise model memory, and for outputting the estimated superimposed-noise spectrum.

3. The noise recognition apparatus of claim 2, wherein the noise model memory stores at least one noise spectrum and a second feature vector corresponding to each of the noise spectrum, as the noise model.

4. The noise recognition apparatus of claim 2, wherein the speech model memory stores at least one noise-free speech feature vector as the noise-free speech model.

5. The noise recognition apparatus of claim 2, wherein the speech model memory stores a model in which syllable models are mutually connected, as the noise-free speech model.

6. The noise recognition apparatus of claim 2, wherein the likelihood calculator calculates second collation data per combination of the noise model and the speech model for collation and outputs the second collation data, and the weight data calculator selects a highest likelihood out of the second collation data output from the likelihood calculator to calculate second weight data.

7. The noise recognition apparatus of claim 2, wherein the likelihood calculator calculates second collation data per combination of the noise model and the speech model for collation and outputs the second collation data, and the weight data calculator selects a plurality of likelihoods, in order of highness of the likelihood, out of the second collation data output from the likelihood calculator to calculate third weight data.

8. The noise recognition apparatus circumstances of claim 7, wherein the likelihood calculator calculates the second collation data per combination of the noise model and the speech model for collation and outputs the second collation data, and the weight data calculator selects the plurality of likelihoods, in order of highness of the likelihood, out of the second collation data, performs a weighted addition of likelihood obtained from the noise model used for calculating the second collation data, and calculates fourth weight data by obtaining one of the noise model whose result of the weighted addition is maximum.

9. A speech recognition method for recognizing an input speech under noisy circumstances, including a noise model memory for storing a noise model, a speech model memory for storing a noise-free speech model, and a reference model memory for storing a plurality of speech models for collation, the method comprising the steps of:

analyzing a noise-superimposed speech signal of the input speech acoustically to output a time-series feature vector of noise-superimposed speech;

estimating a superimposed-noise for the time-series feature vector of noise-superimposed speech by using the noise model stored in the noise model memory and the noise-free speech model stored in the speech model memory to output an estimated superimposed-noise spectrum;

calculating a spectrum of the noise-superimposed speech signal in the input speech by performing a spectrum-analysis to output a time-series noise-superimposed speech spectrum;

eliminating a spectrum component of a noise speech in the noise-superimposed speech signal for the time-series noise-superimposed speech spectrum output from the step of calculating the spectrum by using the estimated superimposed-noise spectrum output from the step of estimating the superimposed-noise to output a time-series noise-eliminated speech spectrum;

calculating a first feature vector from the time-series noise-eliminated speech spectrum to output a time-series feature vector of noise-eliminated speech; and collating the time-series feature vector of noise-eliminated speech with the plurality of speech models for collation stored in the reference model memory to select and output a speech model out of the plurality of speech models for collation, whose likelihood is highest, as a recognition result.

10. The noise recognition method of claim 9, wherein the step of estimating the superimposed-noise further includes steps of:

calculating an estimated-SN-ratio for each noise-superimposed speech feature vector of the time-series feature vector of noise-superimposed speech output from the step of analyzing by using the noise model stored in the noise model memory and the noise-free speech model stored in the speech model memory to output the estimated-SN-ratio;

generating a noise-superimposed speech model by synthesizing the noise model stored in the noise model memory with the noise-free speech model stored in the speech model memory based on the estimated-SN-ratio to output the noise-superimposed speech model;

calculating a likelihood by collating the noise-superimposed speech model with the noise-superimposed speech feature vector, which was used for calculating the estimated-SN-ratio in the step of calculating the estimated-SN-ratio, and by calculating the likelihood between the noise-superimposed speech model and the noise-superimposed speech feature vector to output the likelihood as first collation data;

calculating first weight data for a combination of the each noise-superimposed speech feature vector, the noise model and the noise-free speech model by using the first collation data to output the first weight data; and generating an estimated superimposed-noise spectrum by using the first weight data, the estimated-SN-ratio output from the step of calculating the estimated-SN-ratio, the time-series feature vector of noise-superimposed speech output from the step of analyzing, and the noise model stored in the noise model memory to output the estimated superimposed-noise spectrum.

11. The noise recognition method of claim 10, wherein the step of calculating the likelihood calculates second collation data per combination of the noise model and the speech model for collation and outputs the second collation data, and the step of calculating the weight data selects a highest likelihood out of the second collation data to calculate second weight data.

12. The noise recognition method of claim 10, wherein the step of calculating the likelihood calculates second collation data per combination of the noise model and the speech model and outputs the second collation data, and the step of calculating the weight data selects a plurality of likelihoods, in order of highness of the likelihood, out of the second collation data to calculate third weight data.

13. The noise recognition method of claim 12, wherein the step of calculating the likelihood calculates the second collation data per combination of the noise model and the speech model for collation and outputs the second collation data, and the step of calculating the weight data selects the plurality of likelihoods, in order of highness of the likelihood, out of the second collation data, performs a weighted addition of likelihood obtained from the noise model used for calculating the second collation data, and calculates fourth weight data by obtaining one of the noise model whose result of the weighted addition is maximum.

* * * * *